(12) United States Patent
Nagaki et al.

(10) Patent No.: US 9,768,596 B2
(45) Date of Patent: Sep. 19, 2017

(54) WIRE GRIPPER

(71) Applicant: NAGAKI SEIKI CO., LTD., Osaka (JP)

(72) Inventors: Takayuki Nagaki, Osaka (JP); Kazude Fujiwara, Osaka (JP); Naohiro Hirayama, Osaka (JP); Tamotsu Iwama, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 249 days.

(21) Appl. No.: 14/430,831

(22) PCT Filed: Mar. 18, 2013

(86) PCT No.: PCT/JP2013/057594
§ 371 (c)(1),
(2) Date: Mar. 24, 2015

(87) PCT Pub. No.: WO2014/050171
PCT Pub. Date: Apr. 3, 2014

(65) Prior Publication Data
US 2015/0244154 A1   Aug. 27, 2015

(30) Foreign Application Priority Data

Sep. 28, 2012 (JP) ................................. 2012-217966

(51) Int. Cl.
*H02G 1/06* (2006.01)
*A62B 1/14* (2006.01)
(Continued)

(52) U.S. Cl.
CPC ................. *H02G 1/06* (2013.01); *A62B 1/14* (2013.01); *H02G 1/04* (2013.01); *H02G 7/056* (2013.01);
(Continued)

(58) Field of Classification Search
CPC .. H02G 1/04; H02G 1/00; H02G 1/06; H02G 7/056; B25B 25/00; F16B 2/18; Y10T 24/394; A62B 1/14; F16G 11/101
(Continued)

(56) References Cited

U.S. PATENT DOCUMENTS 1,942,625 A * 1/1934 Whalan .................. F16G 3/006
                                                              24/132 R
2,330,736 A * 9/1943 Paulson .................... B25B 5/12
                                                              24/132 R
(Continued)

FOREIGN PATENT DOCUMENTS

JP       10-126935 A      5/1998
JP     2004-242477 A      8/2004
(Continued)

OTHER PUBLICATIONS

Zip Line Products from You Tube.*
(Continued)

*Primary Examiner* — Larry E Waggle, Jr.
*Assistant Examiner* — Mahdi H Nejad
(74) *Attorney, Agent, or Firm* — Arent Fox LLP

(57) ABSTRACT

A wire gripper 10, which is lightweight and can perform a work for holding a gripped state of a tensioned wire easily and safely, is provided with a stationary gripping body 12 having a wire-like body pressing-down portion 24; a swinging member 14 swingably attached to the stationary gripping body by a supporting shaft 70; a movable gripping body 16 having a wire-like body holding portion; a connection member 18 swinging the swinging member; and a swinging member restricting portion 20 restricting an amount of swinging of the swinging member, wherein the stationary gripping body 12 is formed with reinforcing portions 32 and 40 in a region in which the supporting shaft is attached, and
(Continued)

a wire-like body W clamped does not disengage from between the movable gripping body 16 whose movement amount is restricted by the swinging member restricting portion 20 and the stationary gripping body 12.

15 Claims, 31 Drawing Sheets

(51) Int. Cl.
*H02G 7/05* (2006.01)
*H02G 1/04* (2006.01)
*F16G 11/10* (2006.01)
*B25B 25/00* (2006.01)

(52) U.S. Cl.
CPC ............ *B25B 25/00* (2013.01); *F16G 11/101* (2013.01); *Y10T 24/394* (2015.01)

(58) Field of Classification Search
USPC ............ 294/104, 103.2, 116, 106, 103.1; 254/134.6; 182/5; 188/65.2; 24/132 R, 24/132 WL
See application file for complete search history.

(56) References Cited

U.S. PATENT DOCUMENTS

| | | | | |
|---|---|---|---|---|
| 2,985,933 | A * | 5/1961 | Peterson | H01R 11/15 24/132 R |
| 3,270,582 | A * | 9/1966 | Ellsworth | F16D 1/12 200/19.21 |
| 3,599,297 | A * | 8/1971 | Sievers | F16G 11/105 24/132 R |
| 5,316,103 | A * | 5/1994 | Bell | A62B 35/005 182/18 |
| 6,367,744 | B1 * | 4/2002 | Ebersole | F16L 3/24 24/458 |
| D637,634 | S * | 5/2011 | Chen | D15/138 |
| D637,635 | S * | 5/2011 | Chen | D15/138 |
| D645,888 | S * | 9/2011 | Chen | D15/138 |
| D732,362 | S * | 6/2015 | Nagaki | D8/52 |
| D764,268 | S * | 8/2016 | Nagaki | D8/396 |
| 9,434,587 | B2 * | 9/2016 | Nagaki | H02G 1/04 |
| 2007/0234515 | A1 * | 10/2007 | Chen | G06F 1/1616 16/337 |
| 2012/0000037 | A1 * | 1/2012 | Chen | B25G 1/10 24/134 N |
| 2012/0005863 | A1 * | 1/2012 | Chen | A62B 1/14 24/132 R |
| 2012/0005864 | A1 * | 1/2012 | Chen | A62B 1/14 24/132 WL |
| 2012/0126602 | A1 * | 5/2012 | Sollars | B60N 2/2236 297/362.11 |
| 2015/0232314 | A1 * | 8/2015 | Nagaki | B66F 19/00 294/135 |

FOREIGN PATENT DOCUMENTS

| | | | |
|---|---|---|---|
| JP | 2004242477 | * | 8/2004 |
| JP | 2004242477 A1 | * | 8/2004 |
| JP | 2009-90881 A | | 4/2009 |

OTHER PUBLICATIONS

Nagaki Wire-Grip-Catalog.*
Klein Tools wire-pulling-grips Catalog.*
International Search Report mailed May 7, 2013, in corresponding International Patent Application No. PCT/JP2013/057594.

* cited by examiner

[FIG. 1]
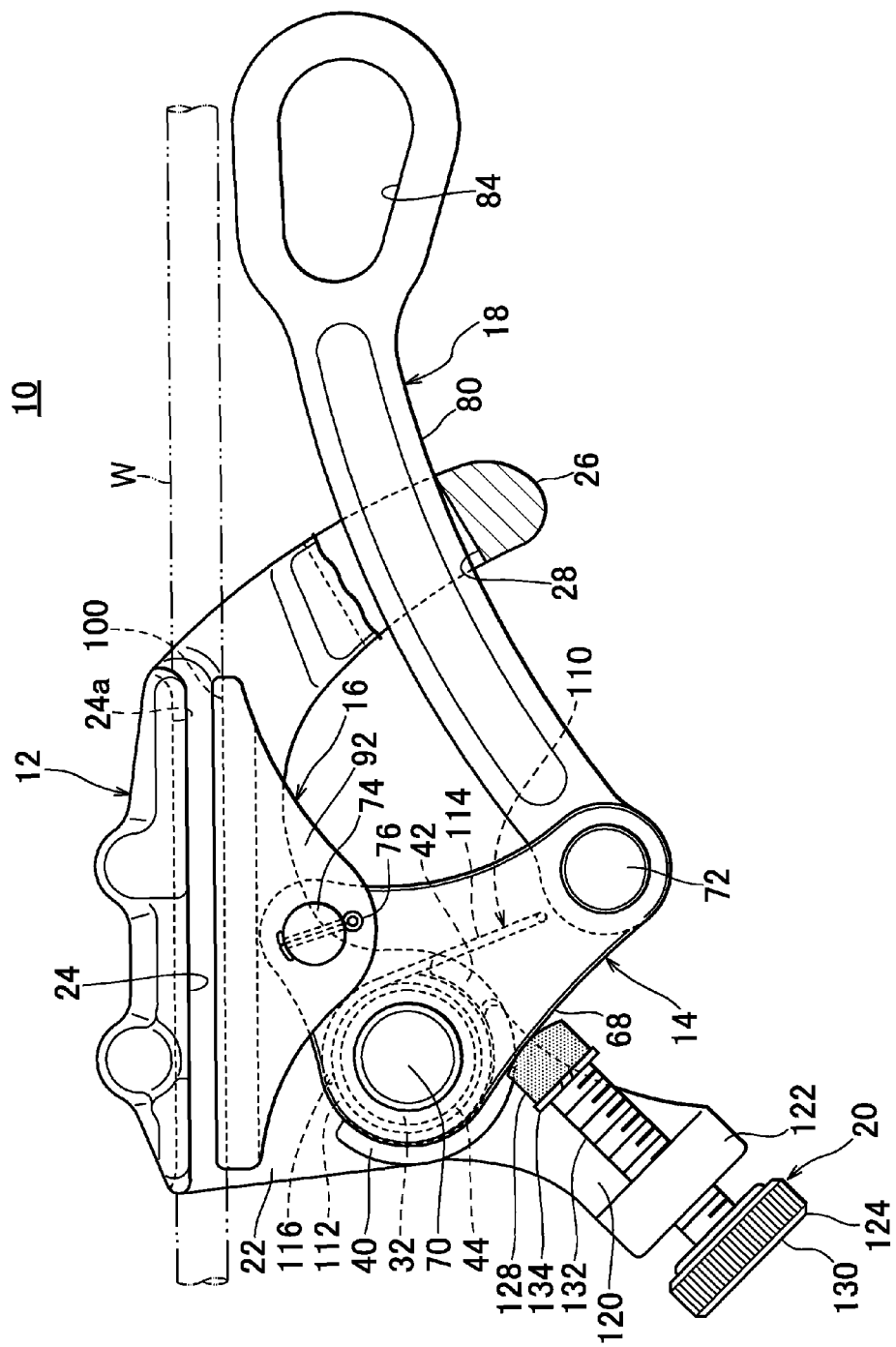

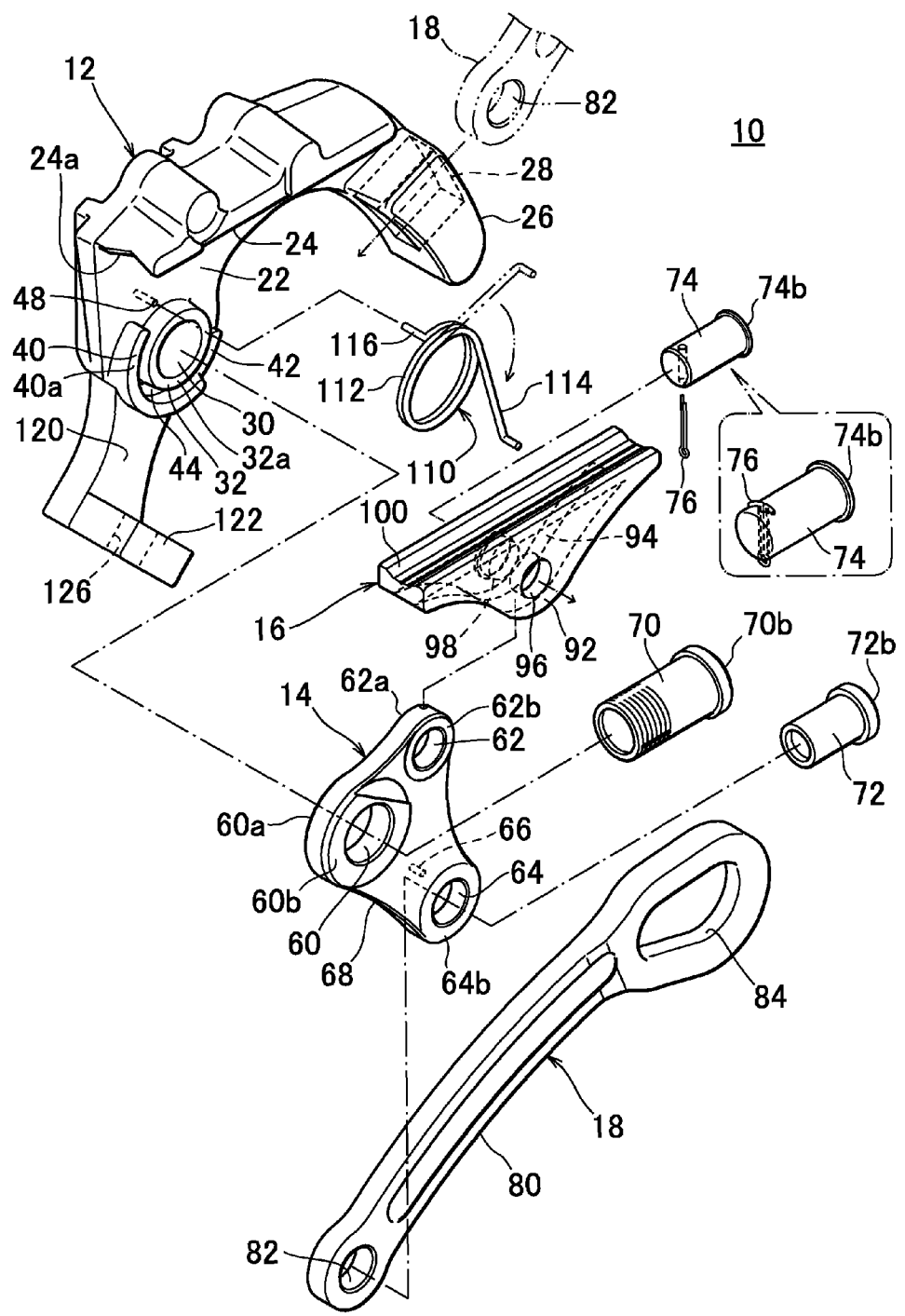
[FIG. 2]

[FIG. 3]
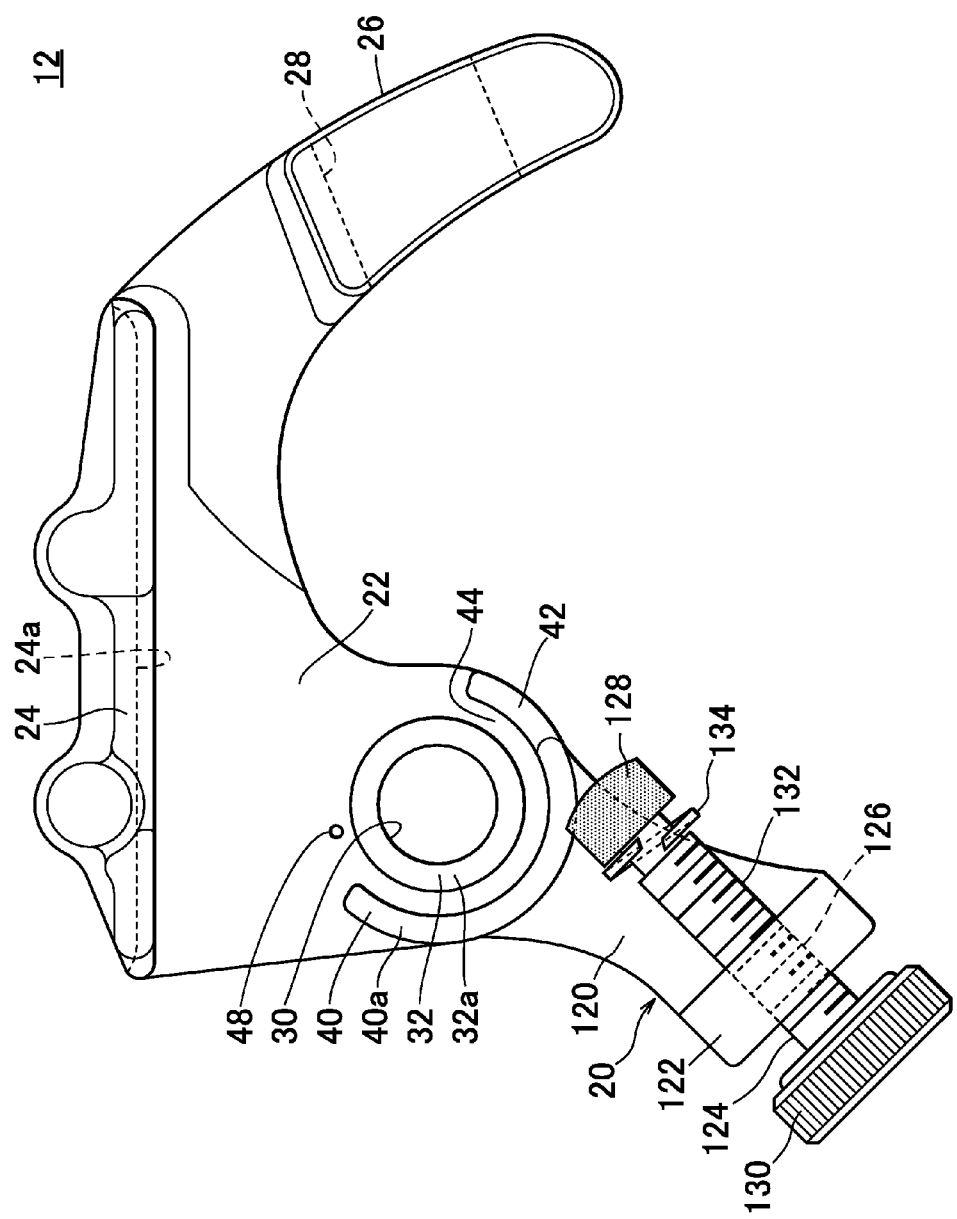

[FIG. 4]
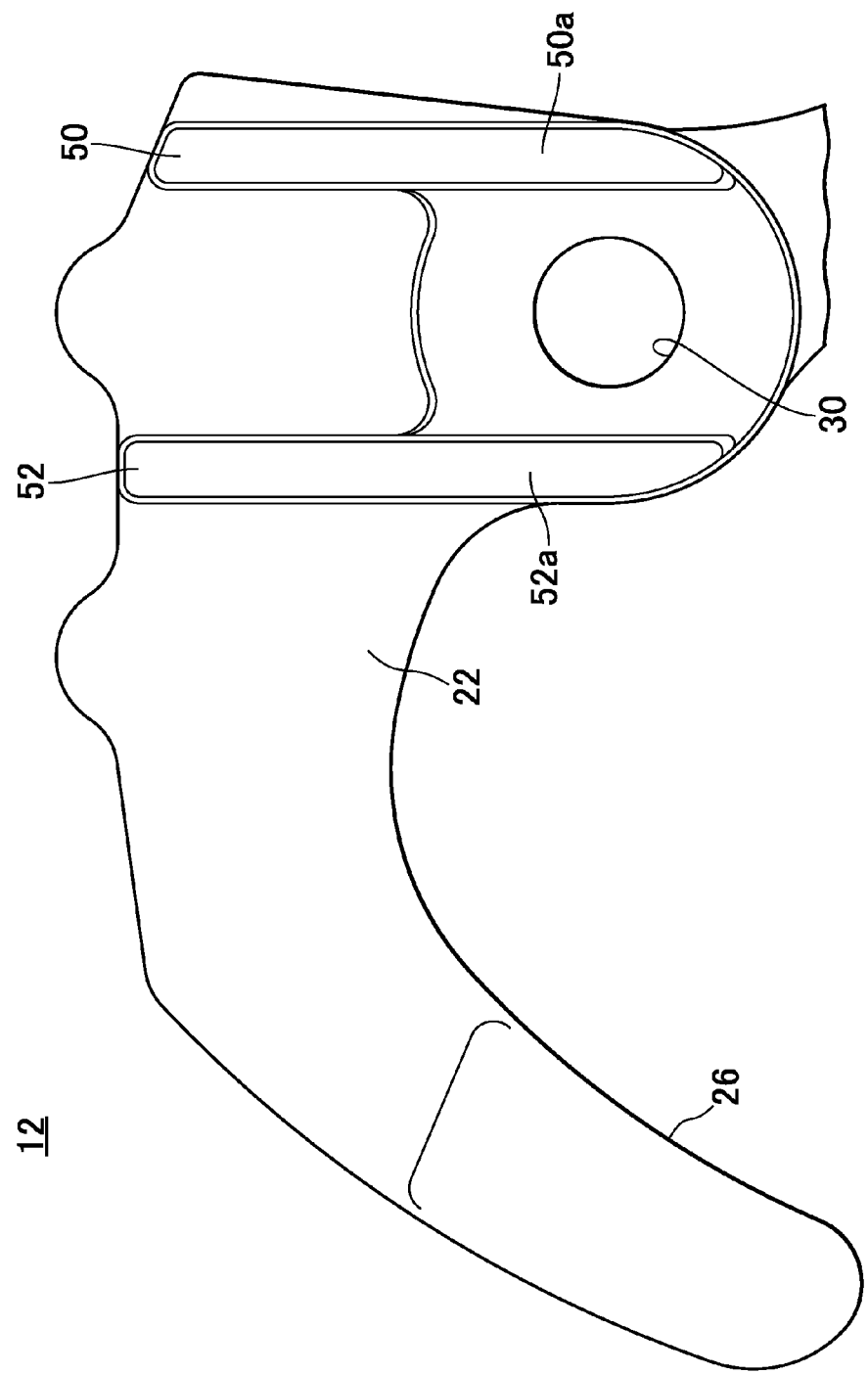

[FIG. 5A]
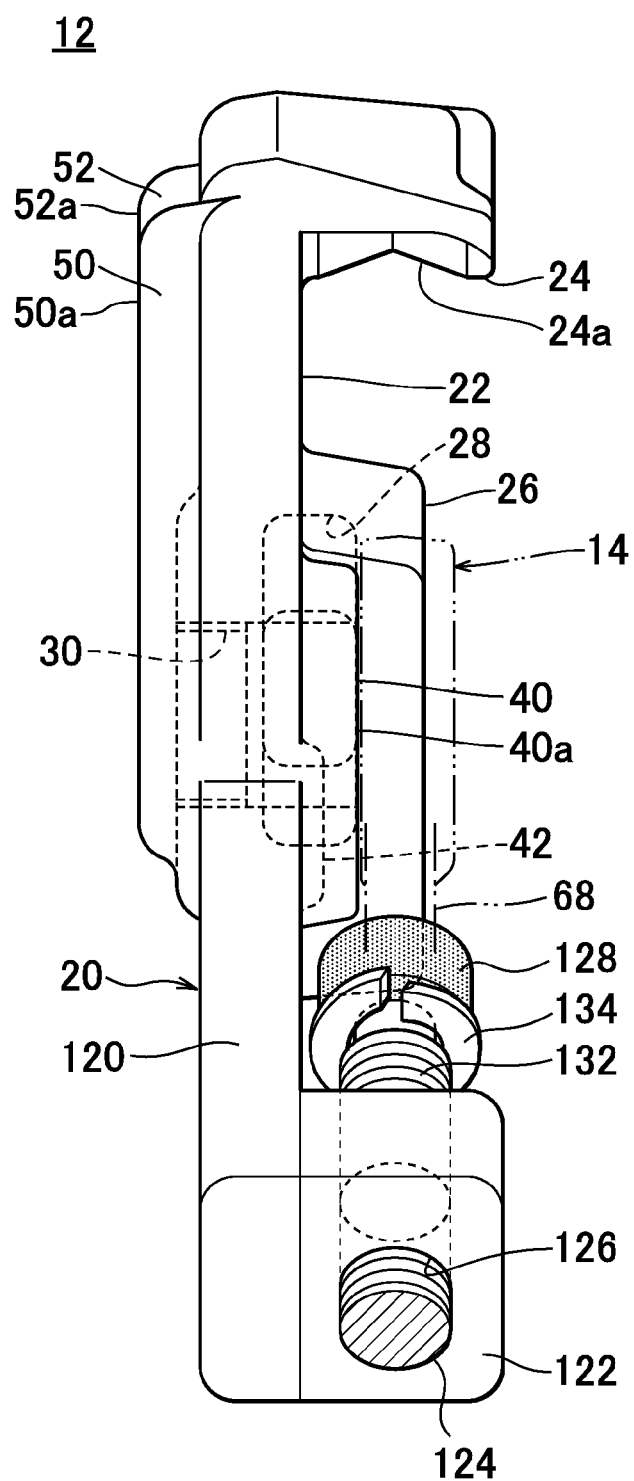

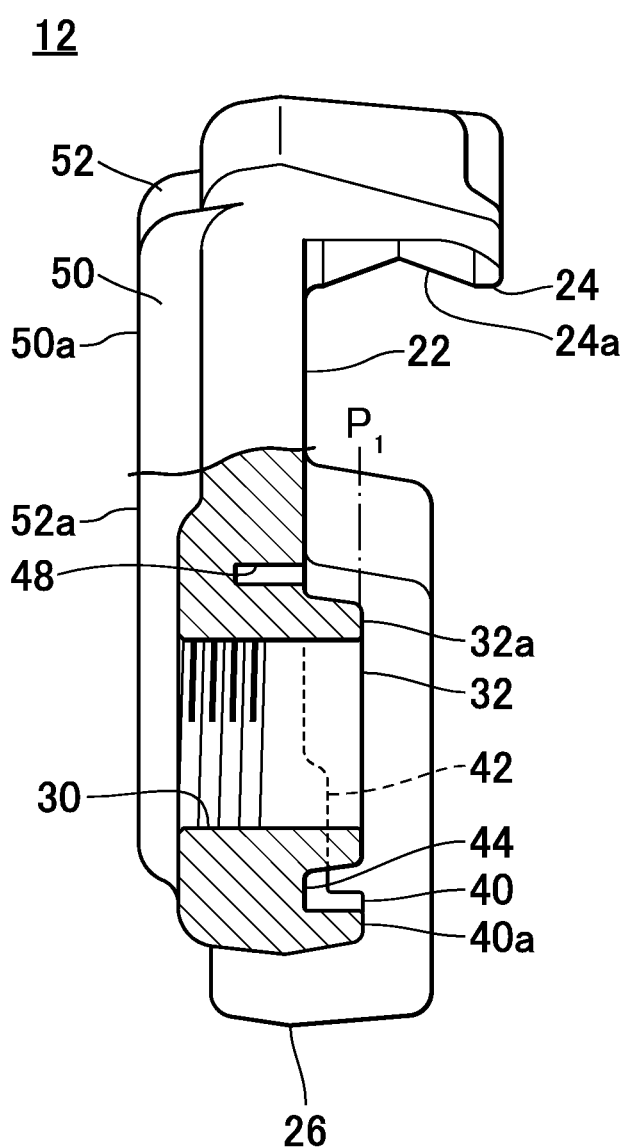
[FIG. 5B]

[FIG. 6]
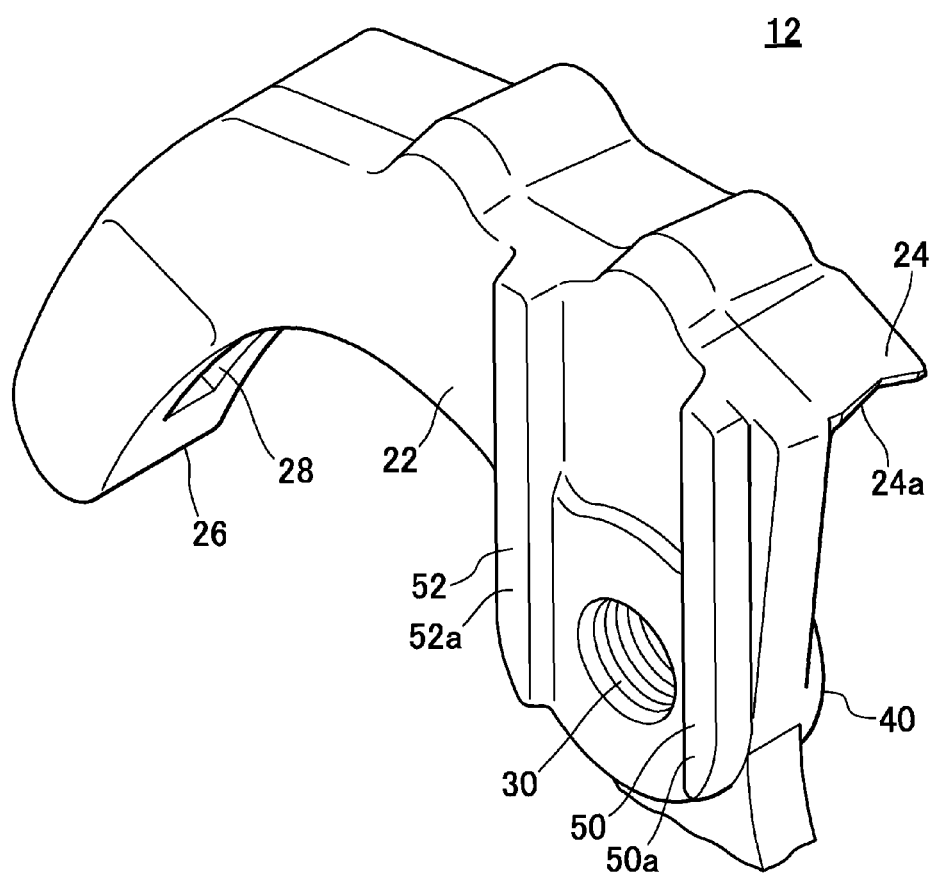

[FIG. 7]
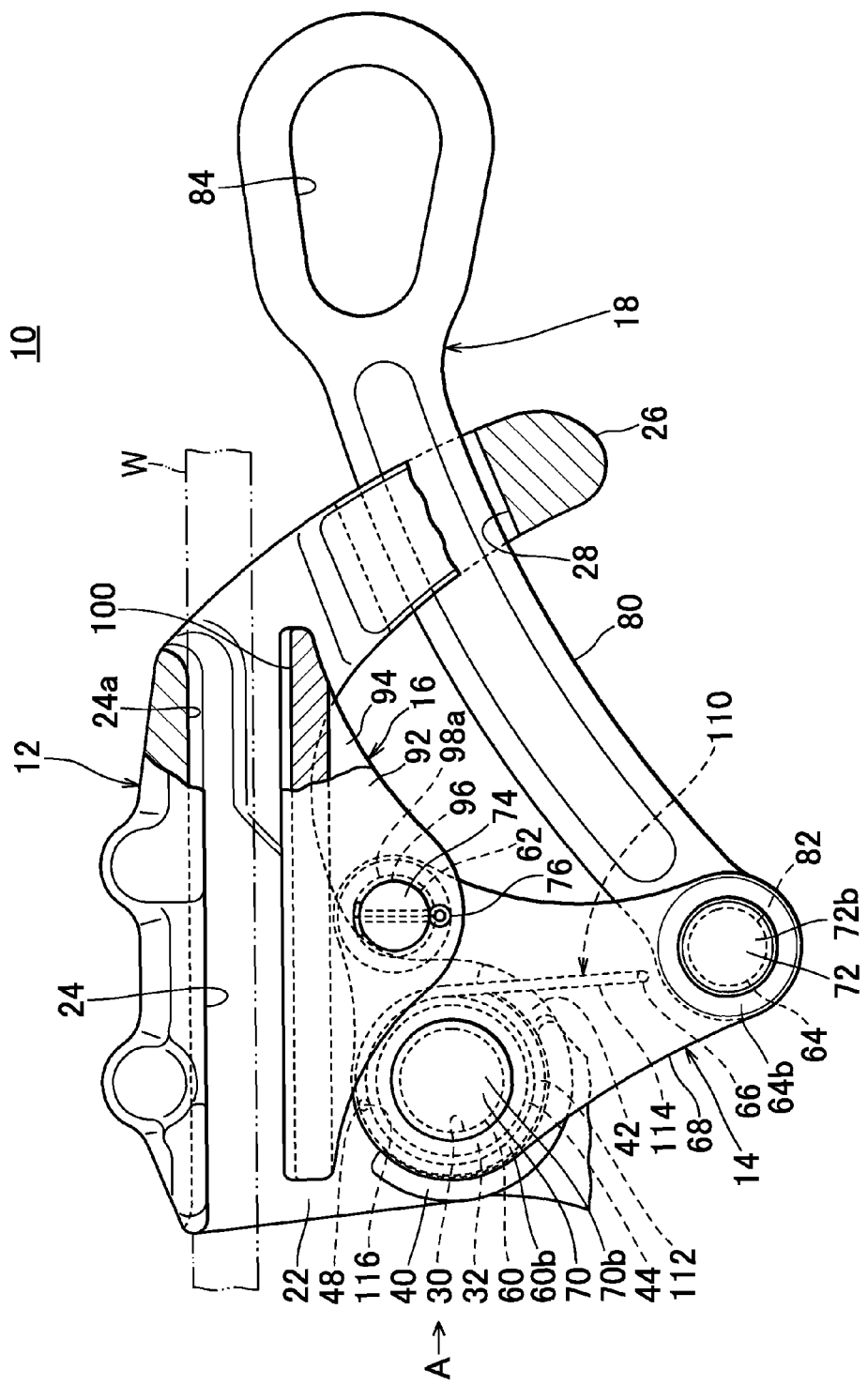

[FIG. 8]
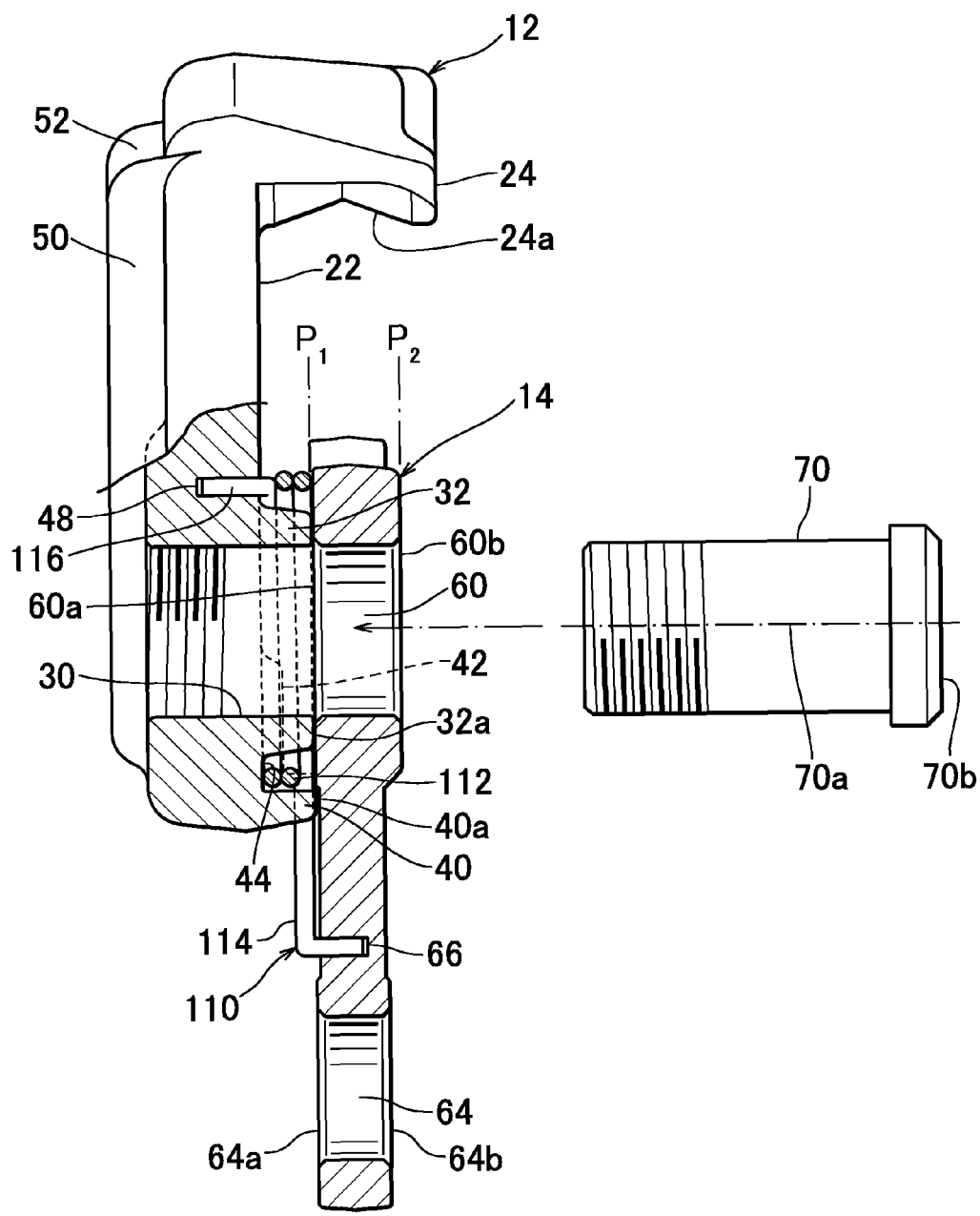

[FIG. 9]
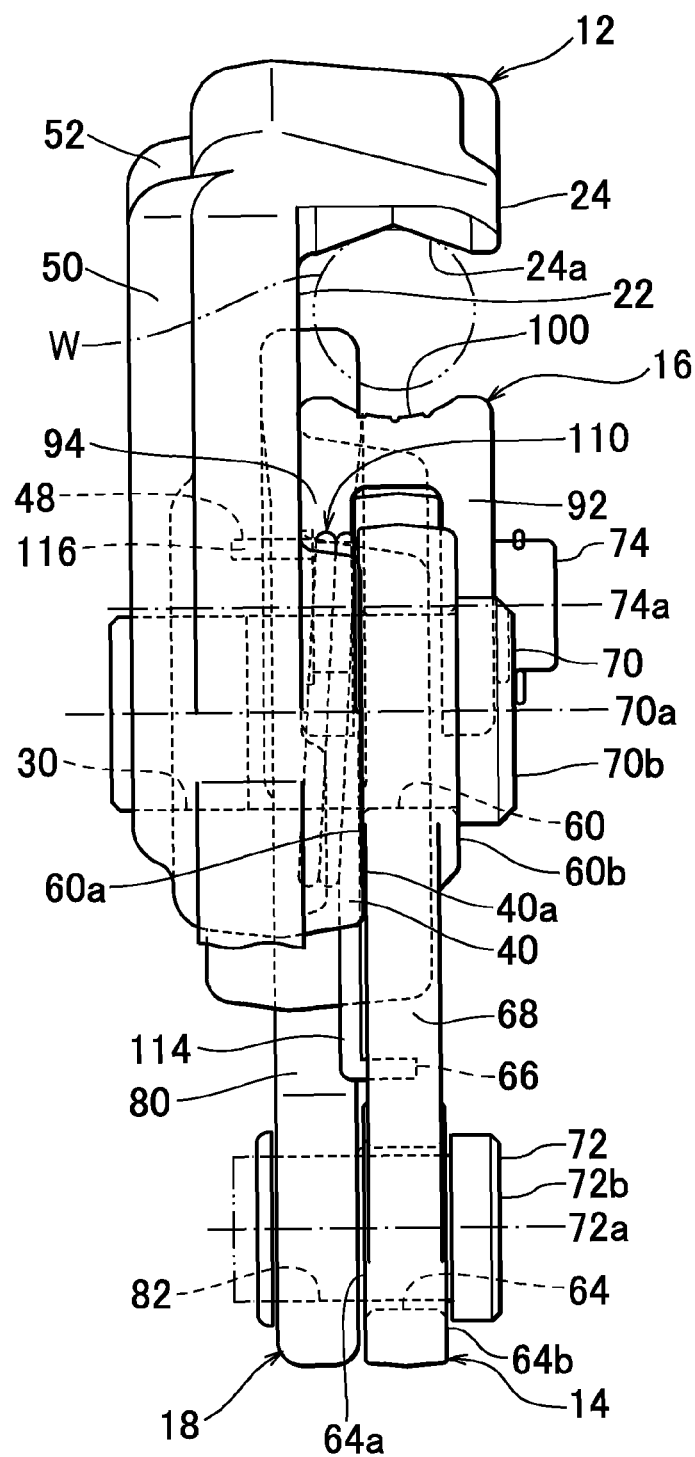

【FIG. 10】
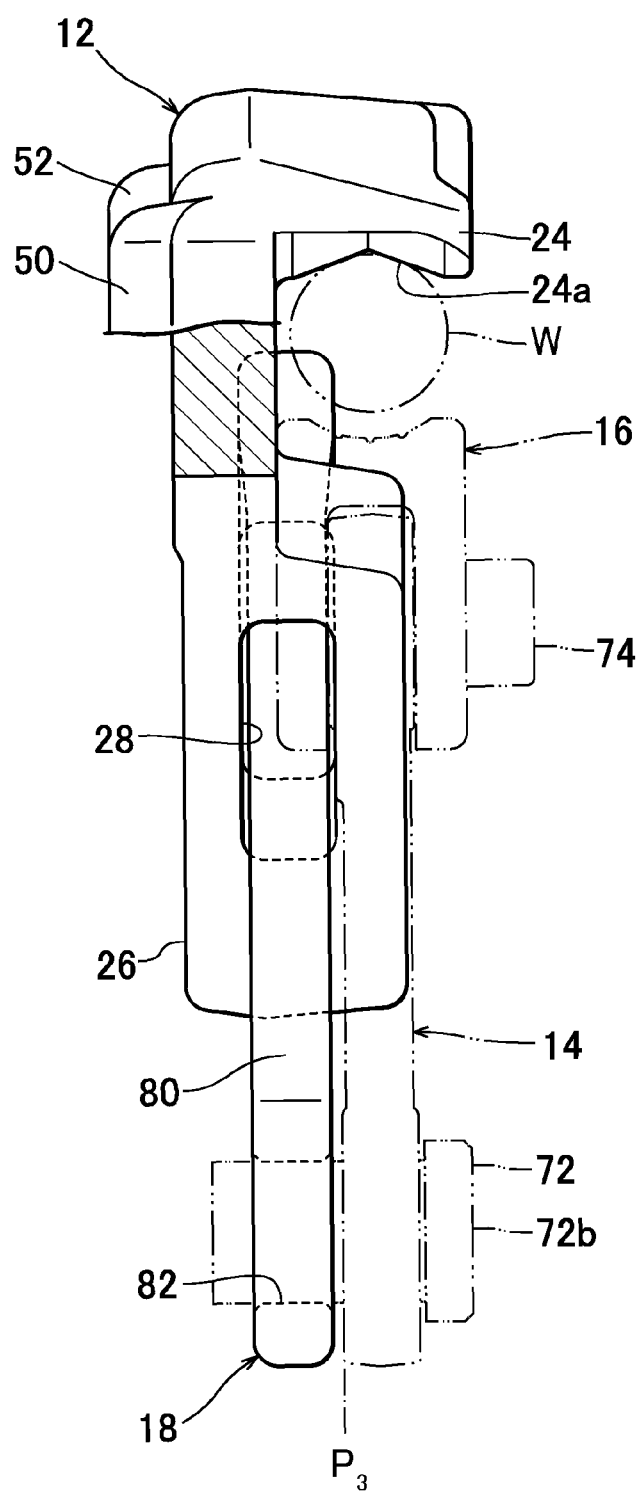

[FIG. 11]
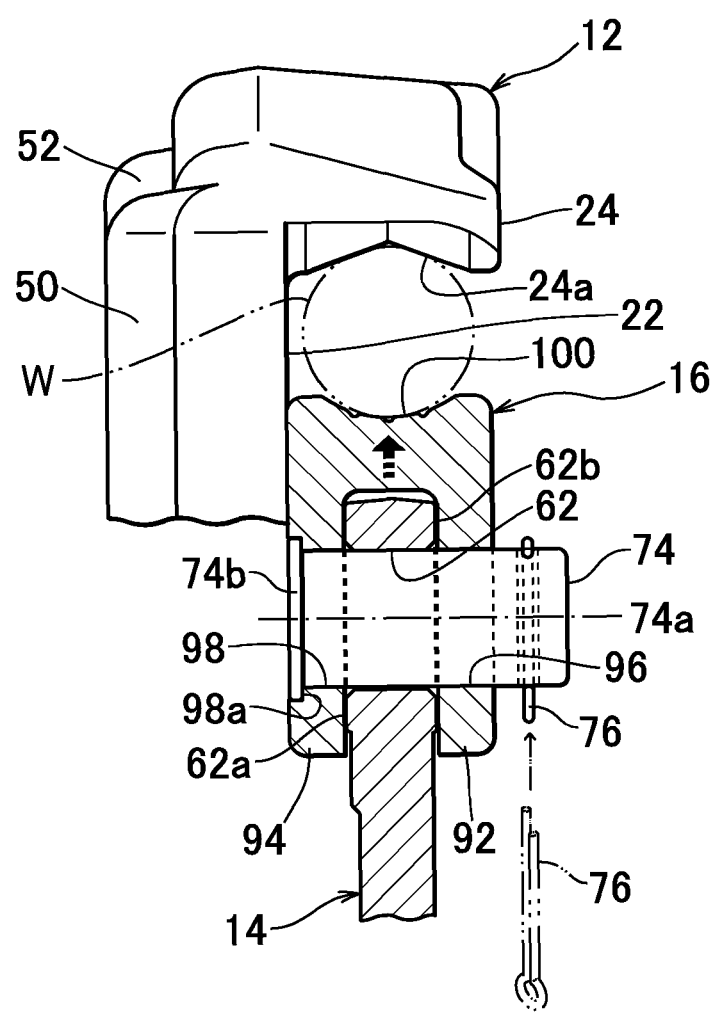

[FIG. 12]
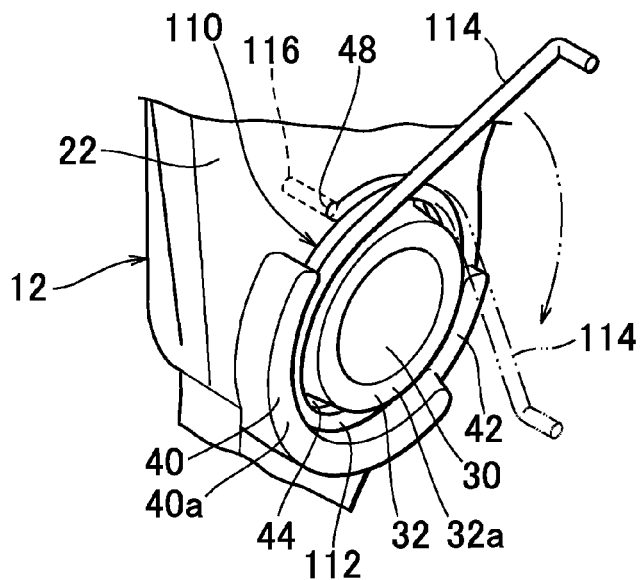
[FIG. 13]
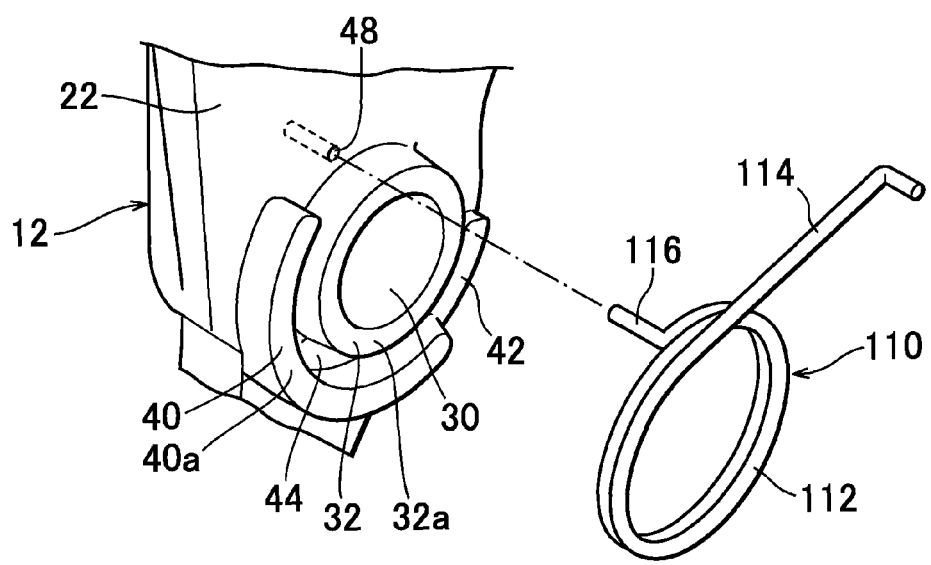

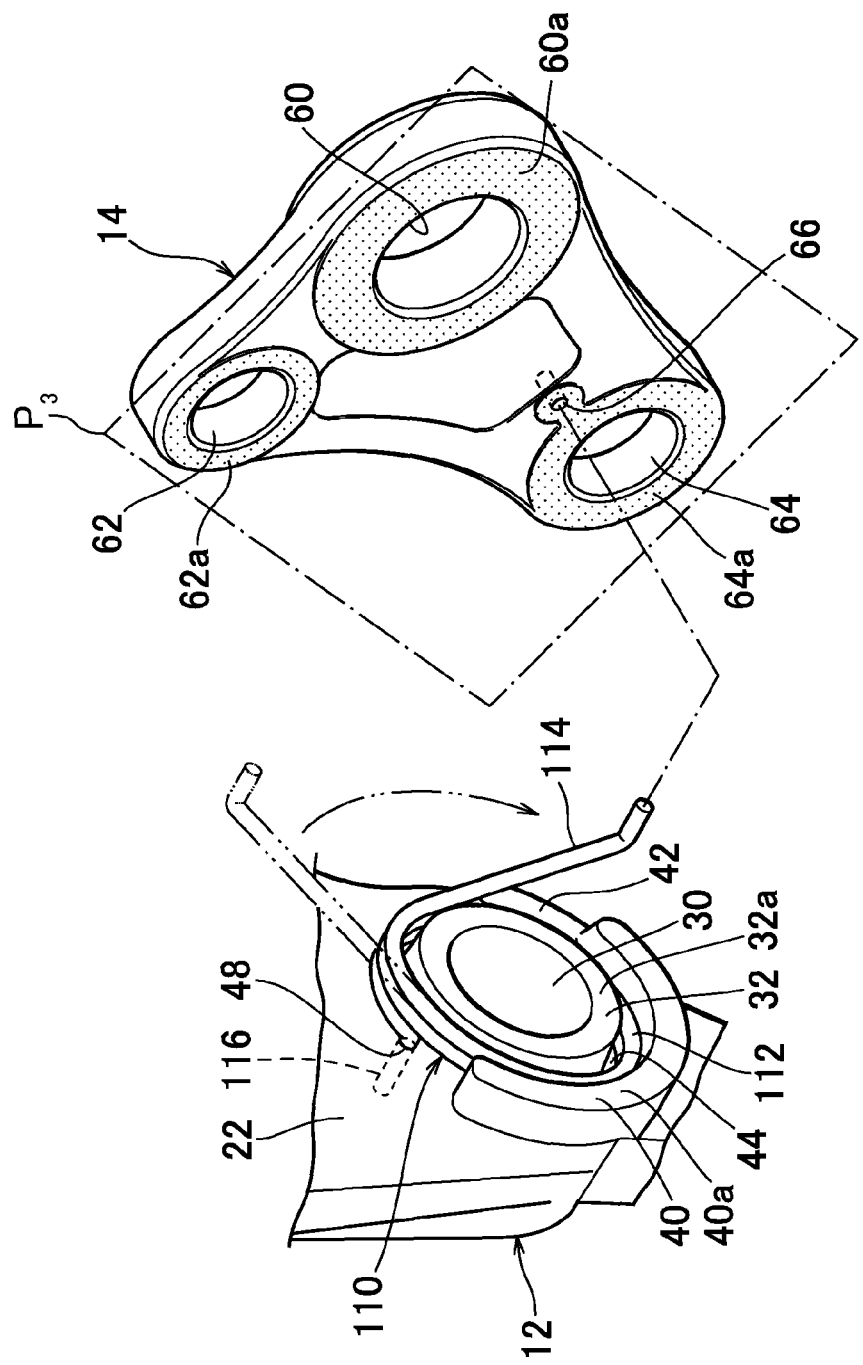
[FIG. 14]

[FIG. 15]
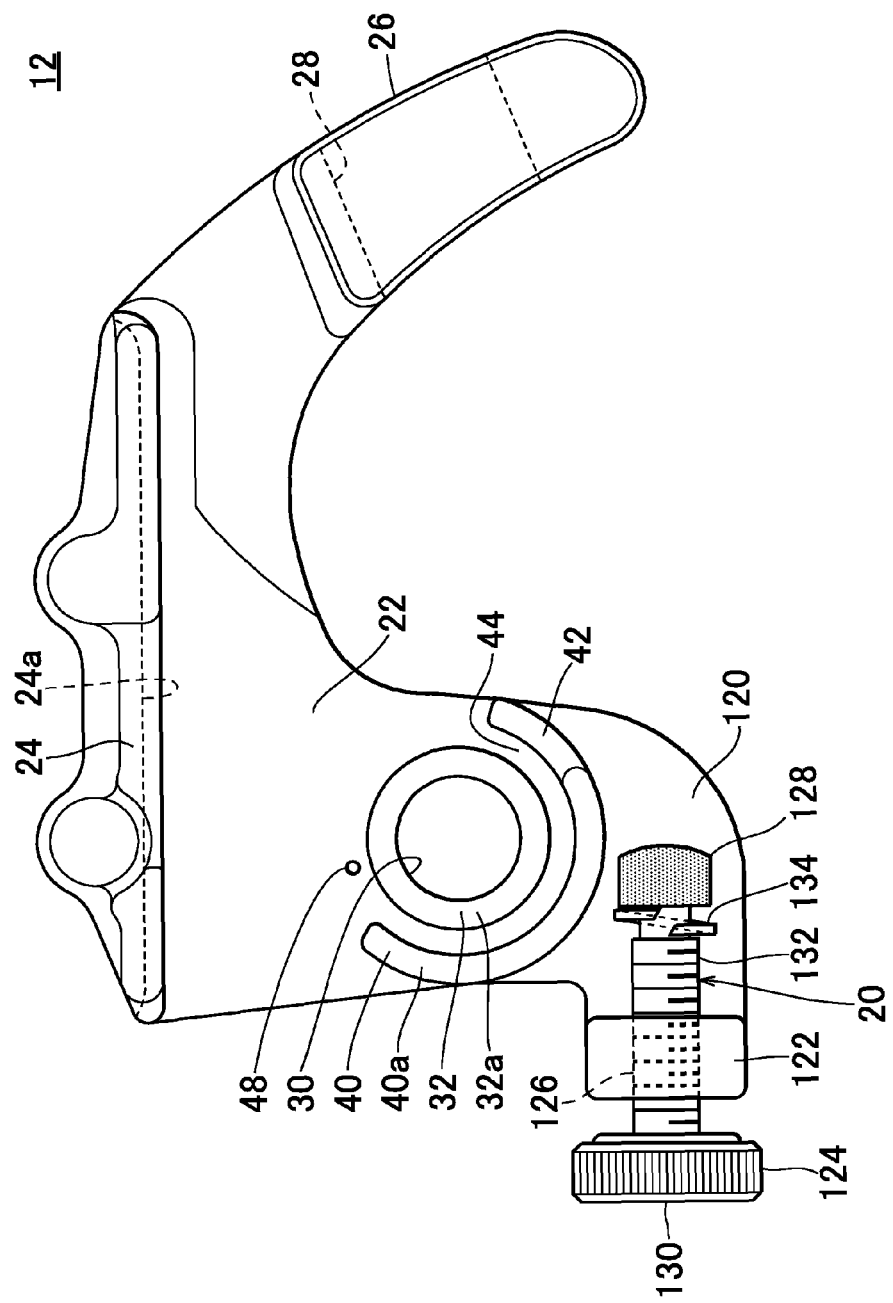

【FIG. 16】
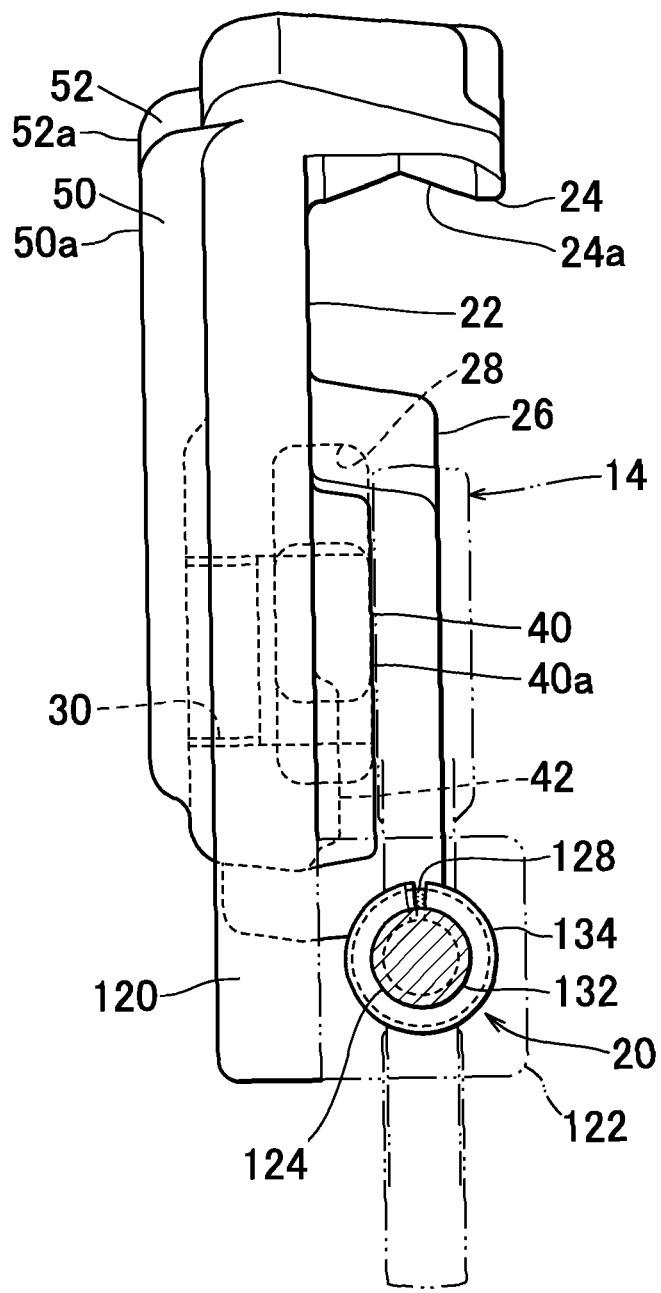

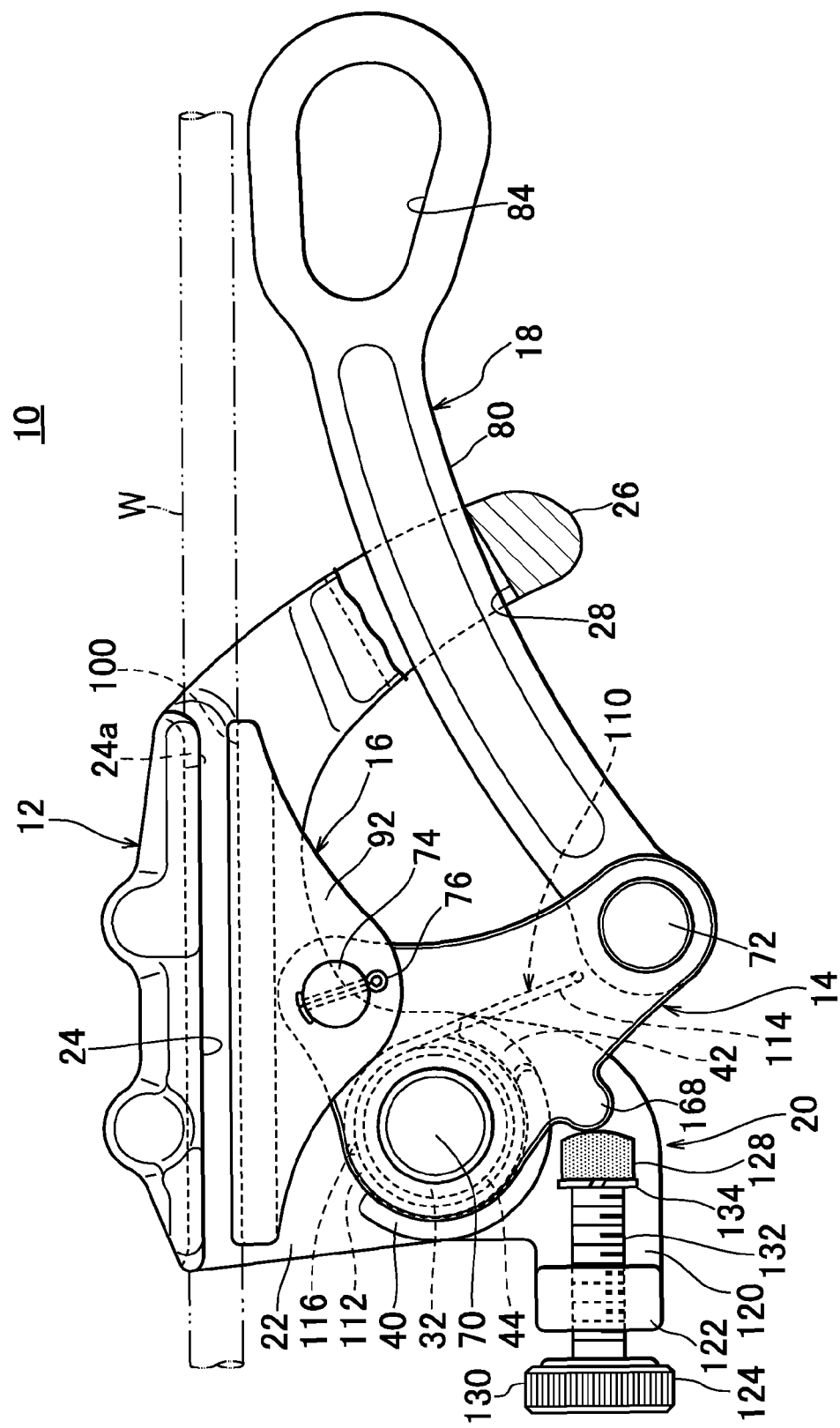
[FIG. 17]

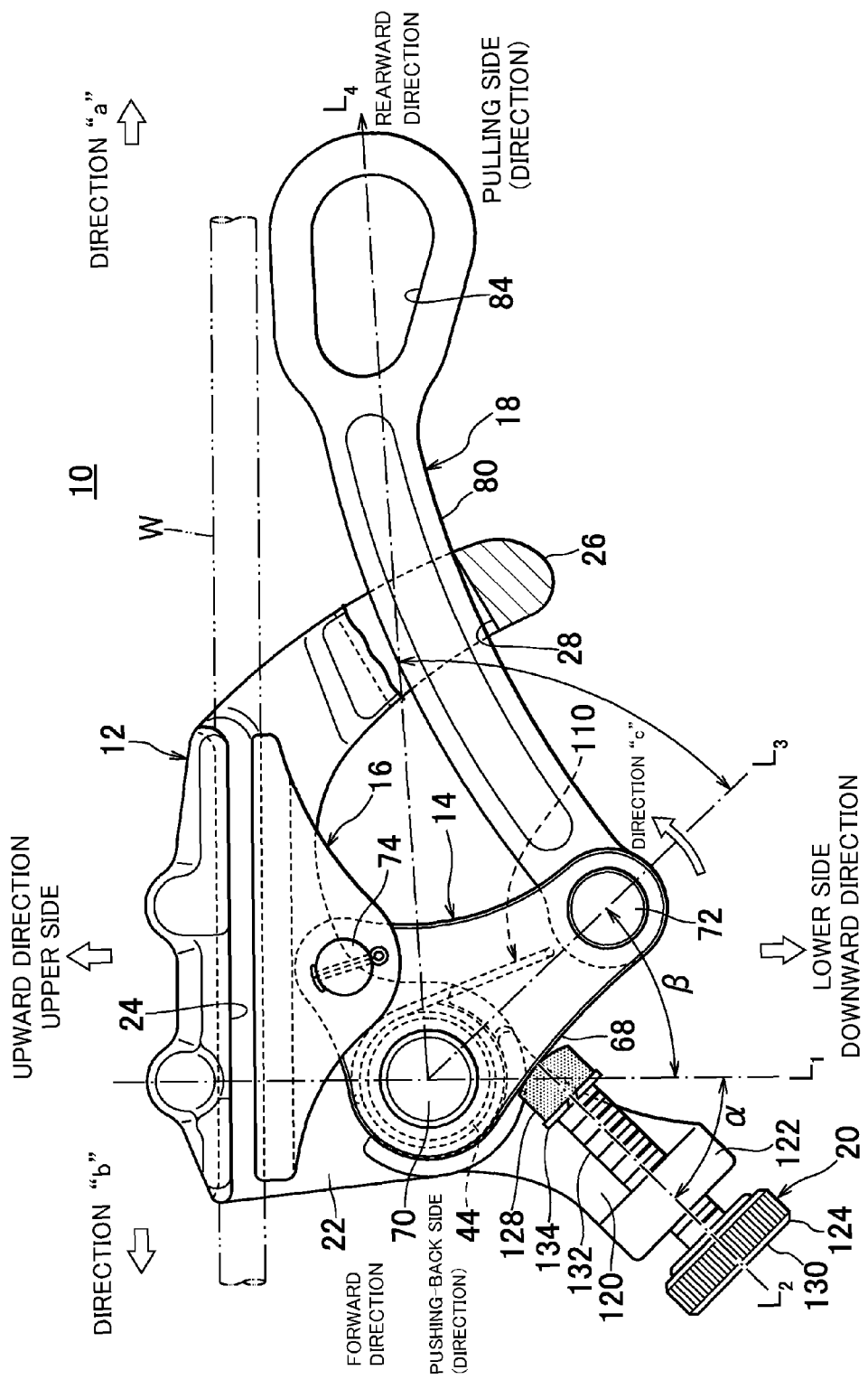
[FIG. 18A]

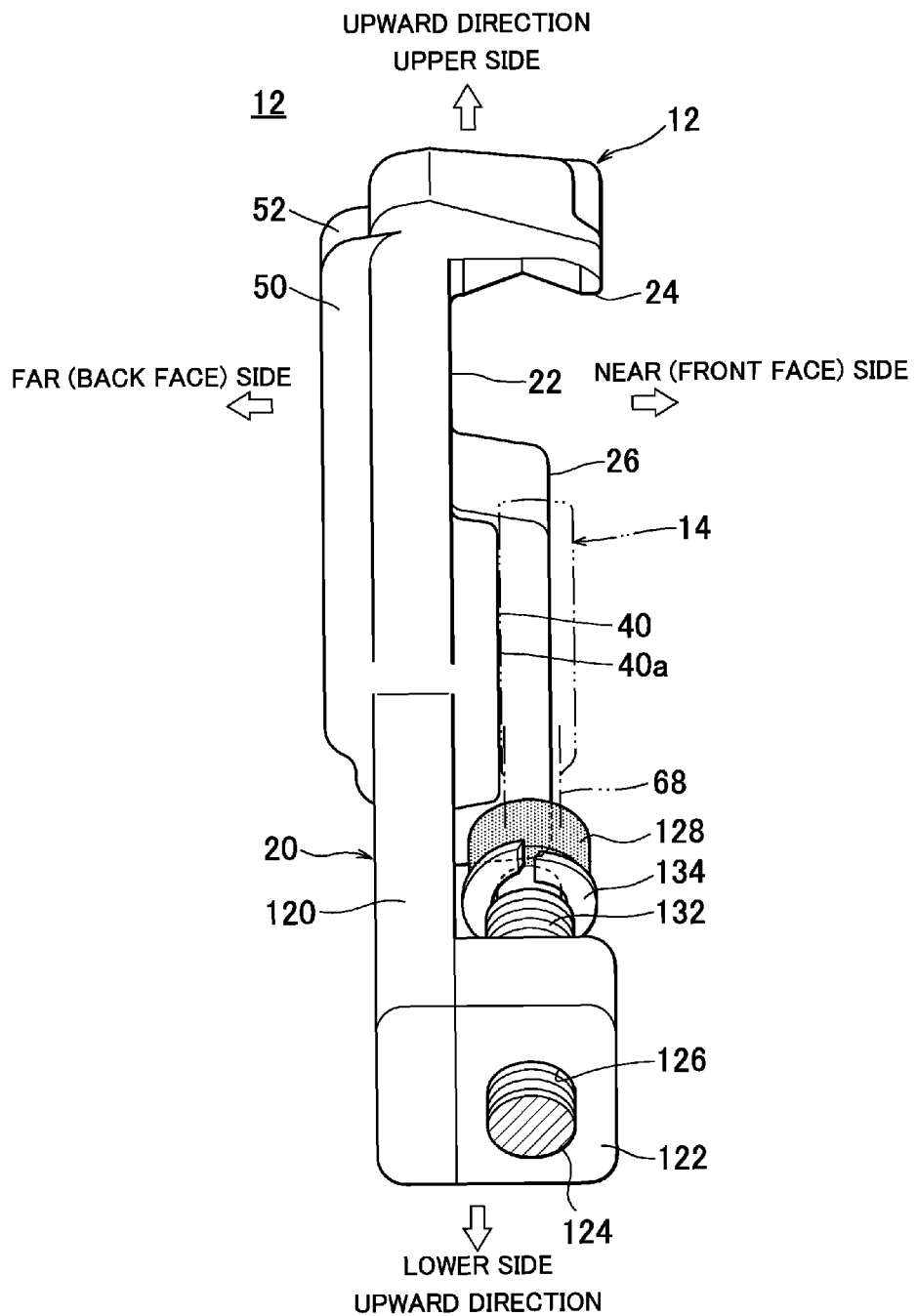
[FIG. 18B]

【FIG. 19A】
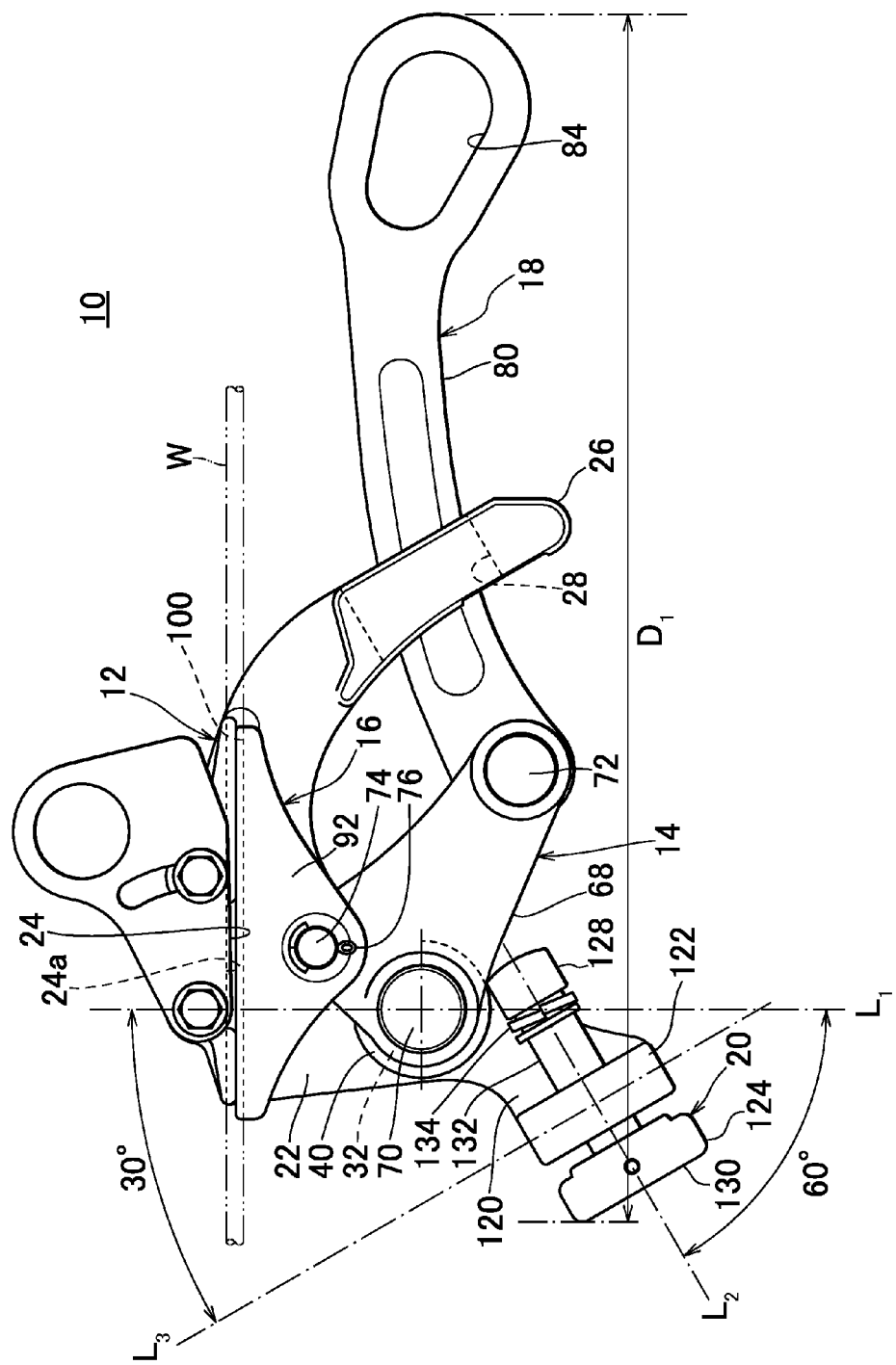

[FIG. 19B]
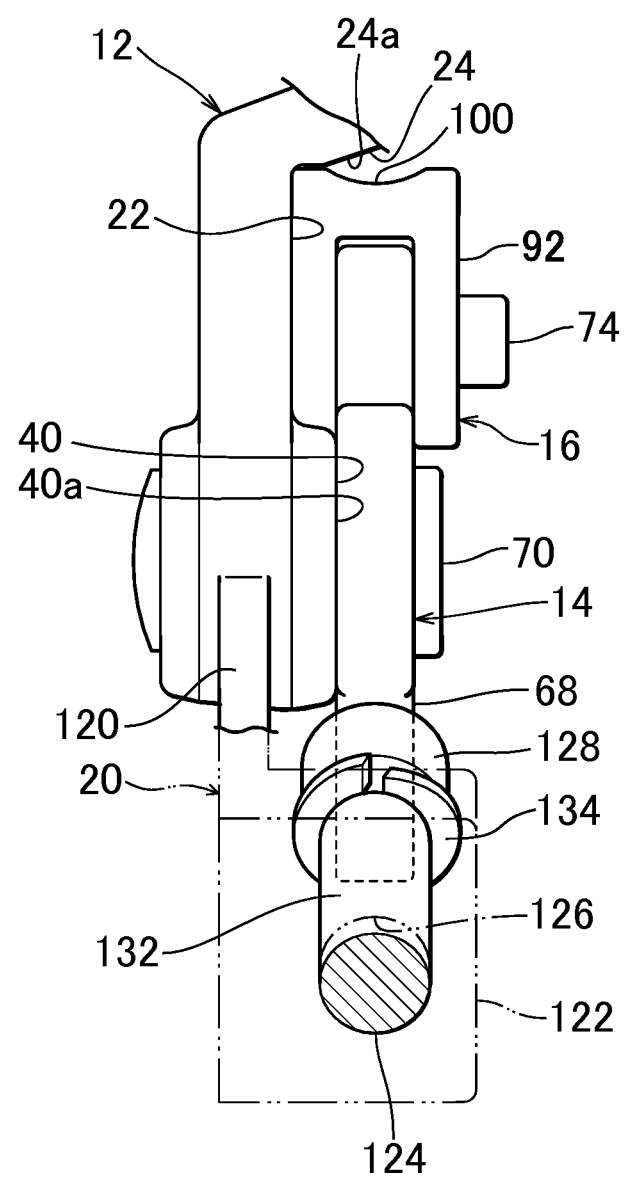

【FIG. 20A】
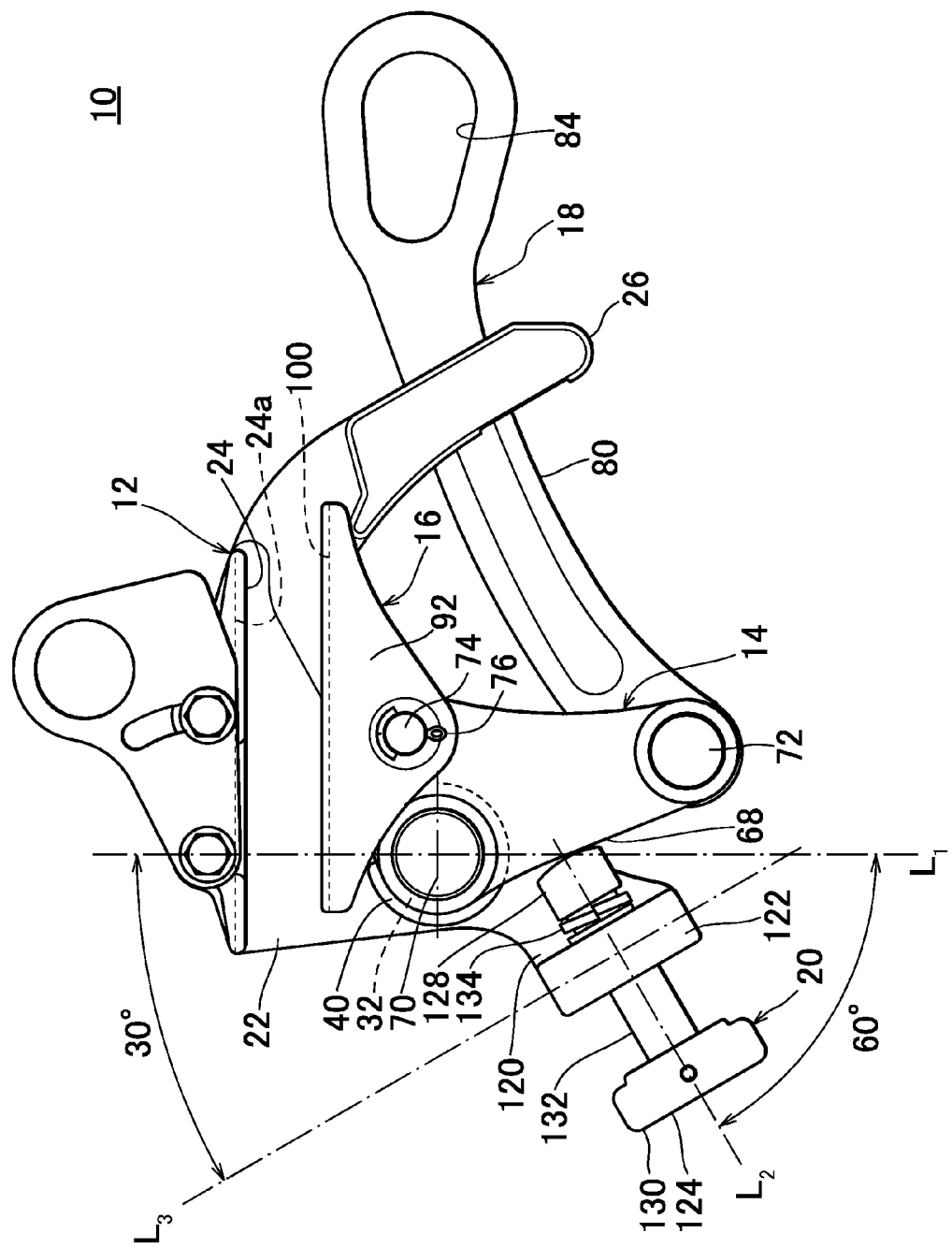

【FIG. 20B】
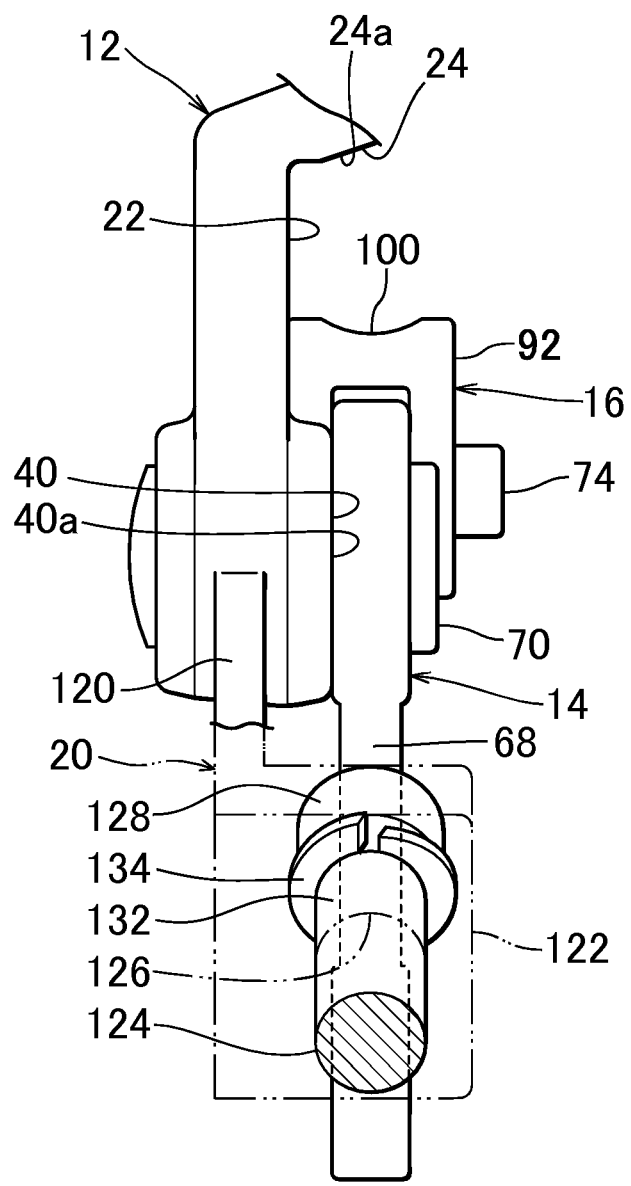
60° OPENING MAXIMUM

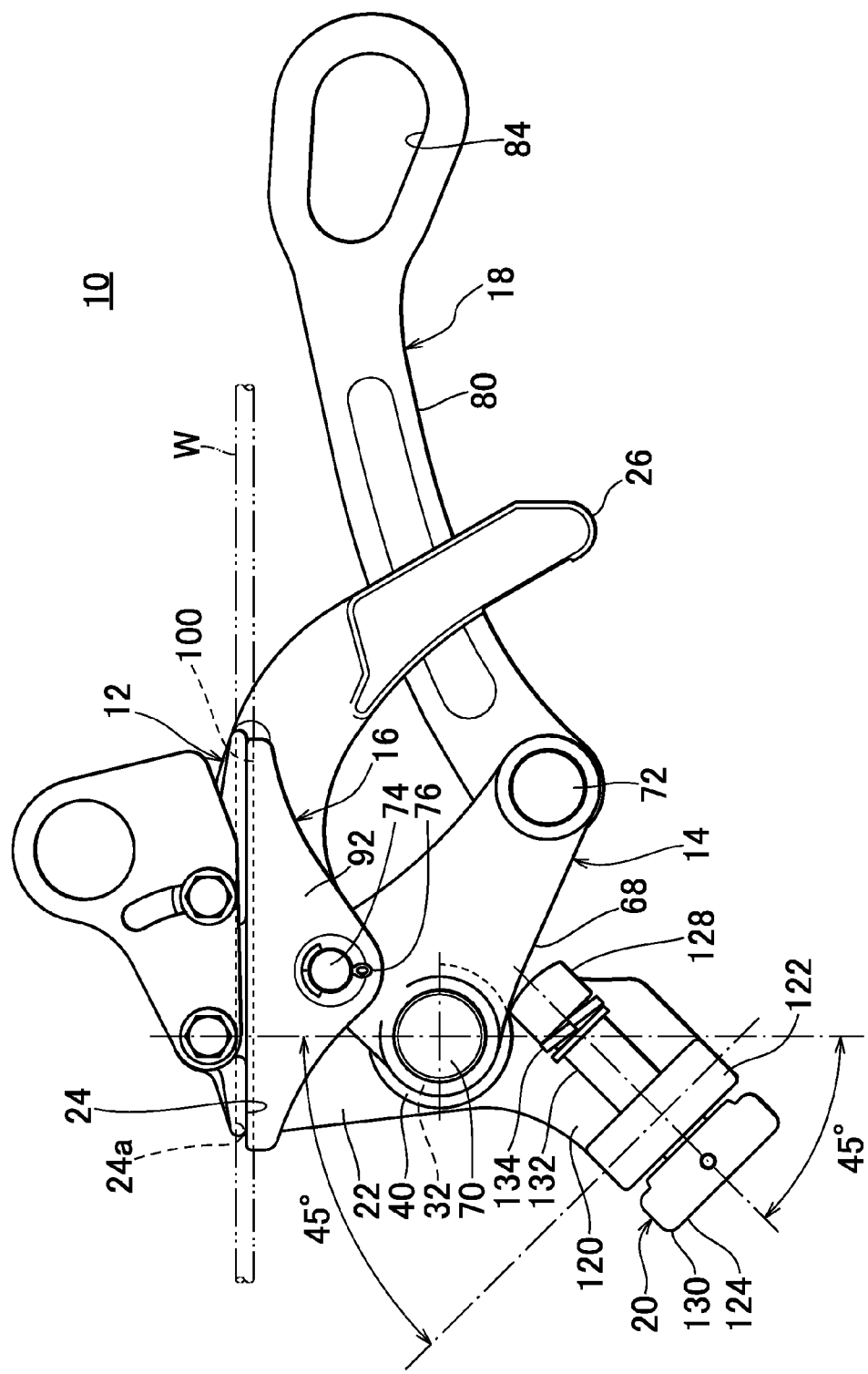
【FIG. 21A】

【FIG. 21B】
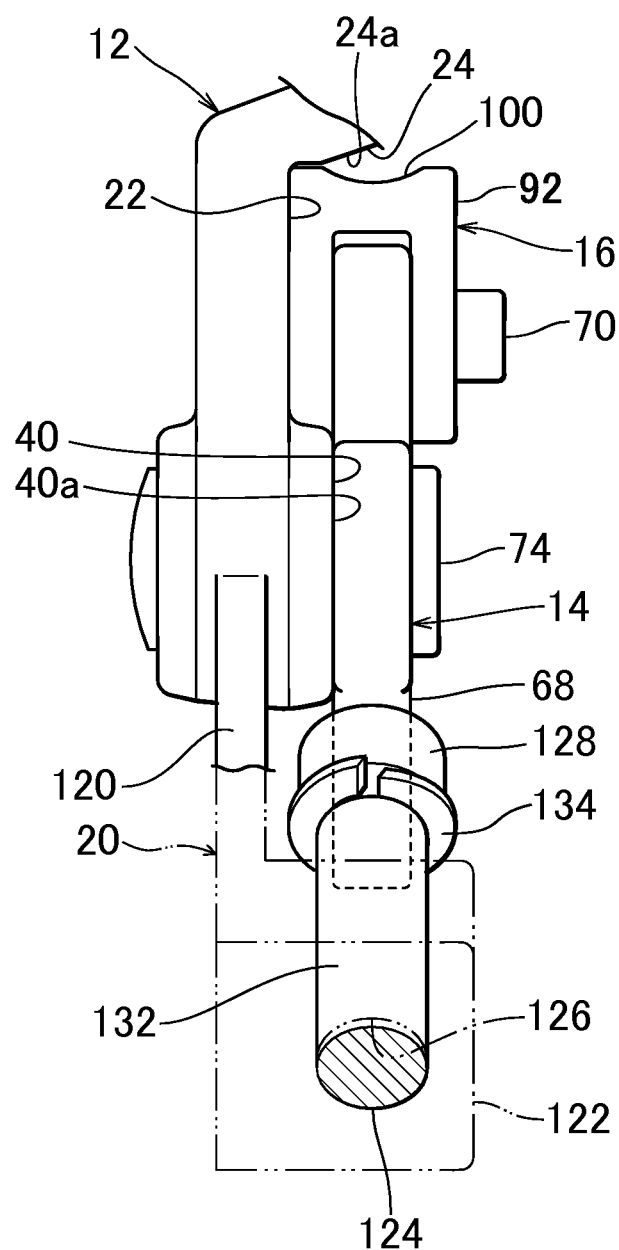
45° OPENING MINIMUM

[FIG. 22A]
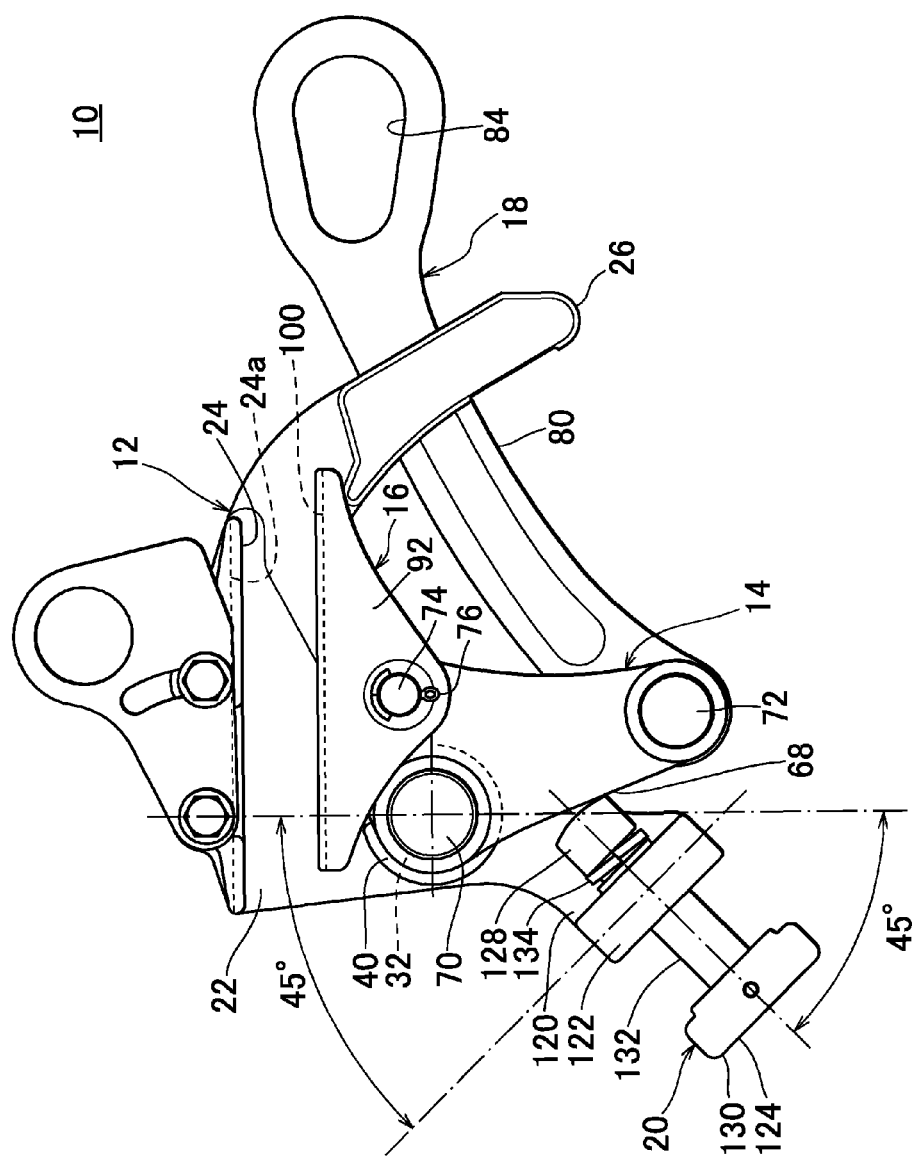

【FIG. 22B】
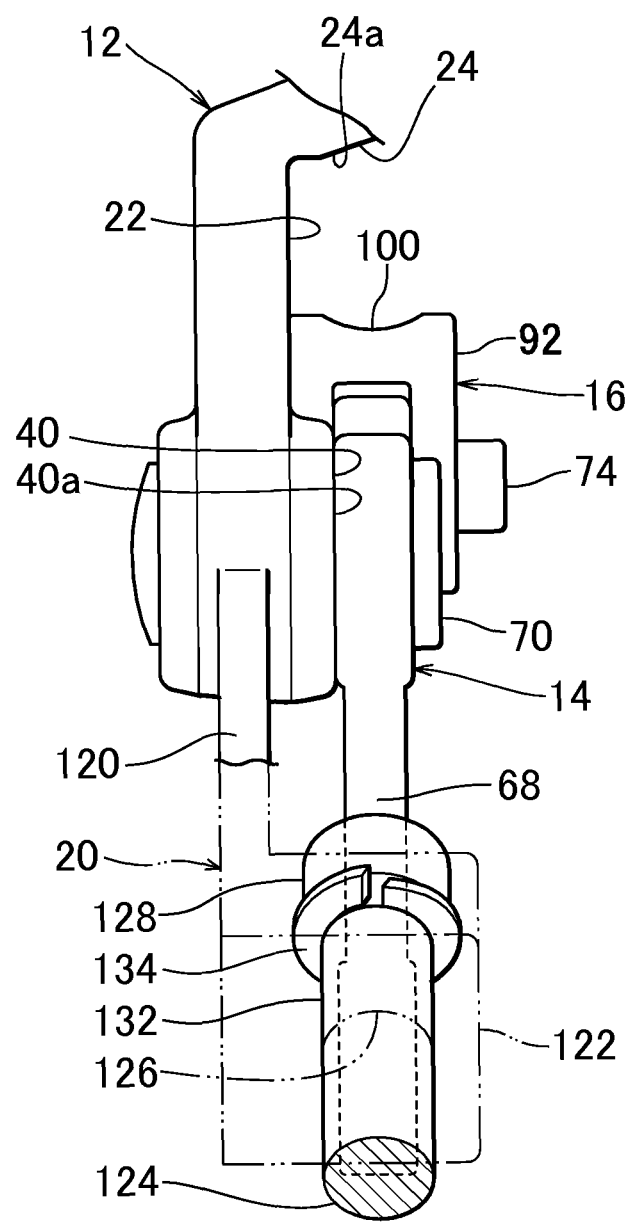
45° OPENING MAXIMUM

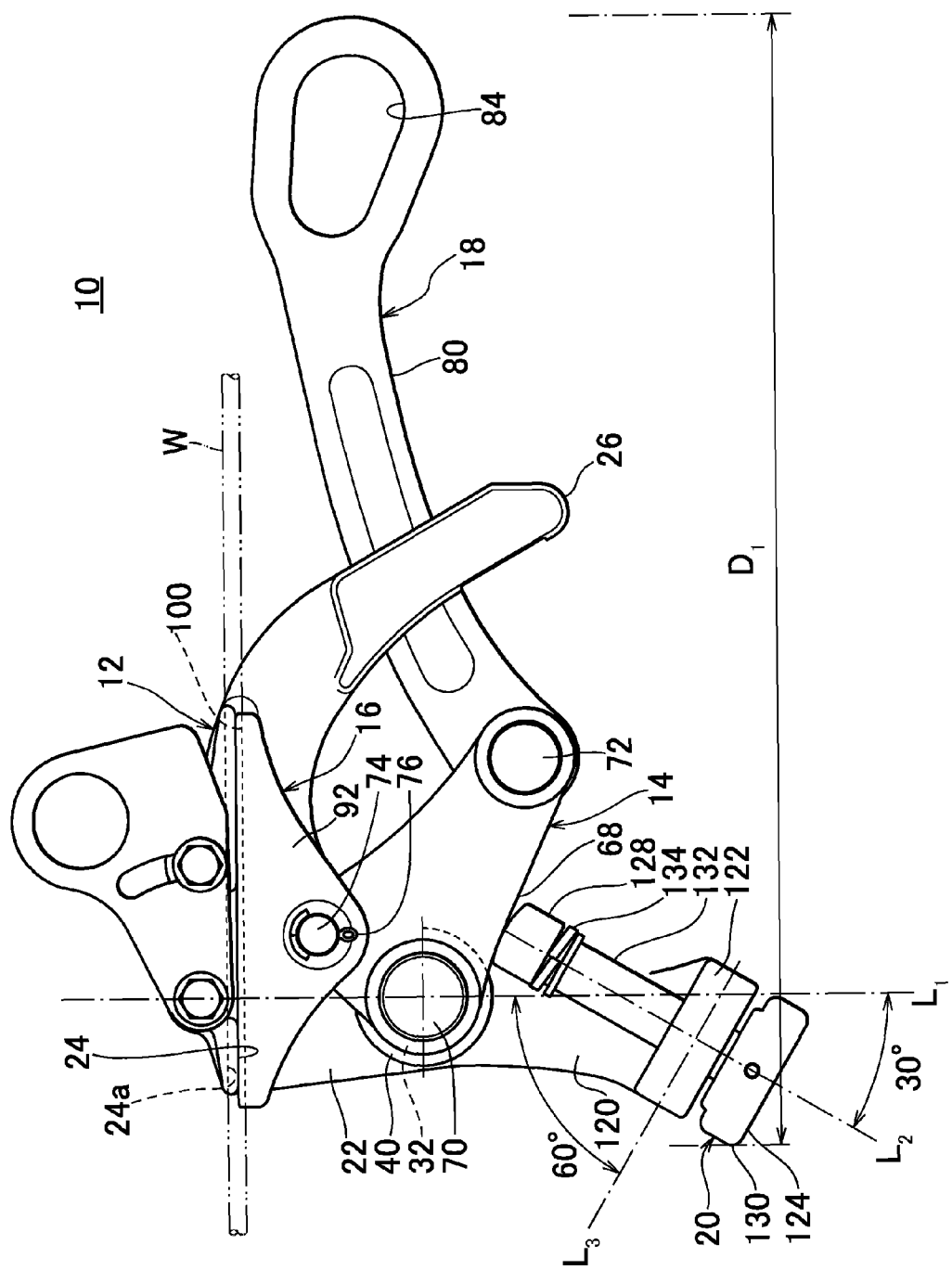
[FIG. 23A]

【FIG. 23B】
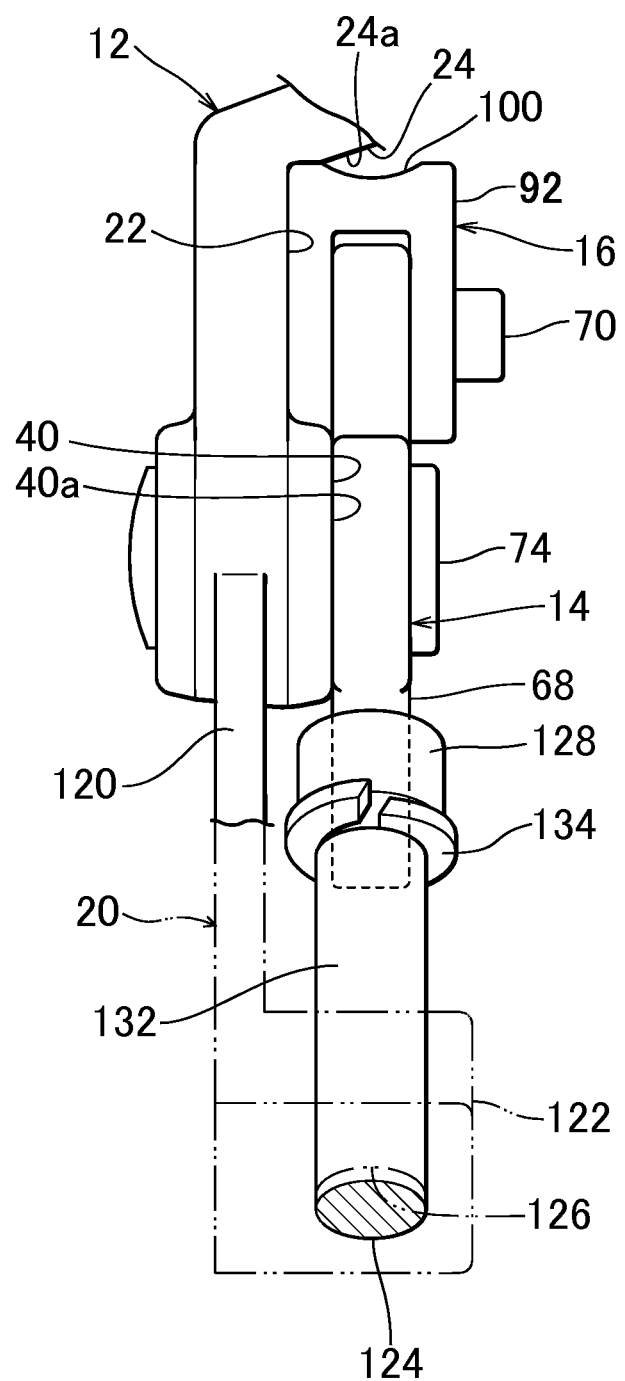
30° OPENING MINIMUM

[FIG. 24A]
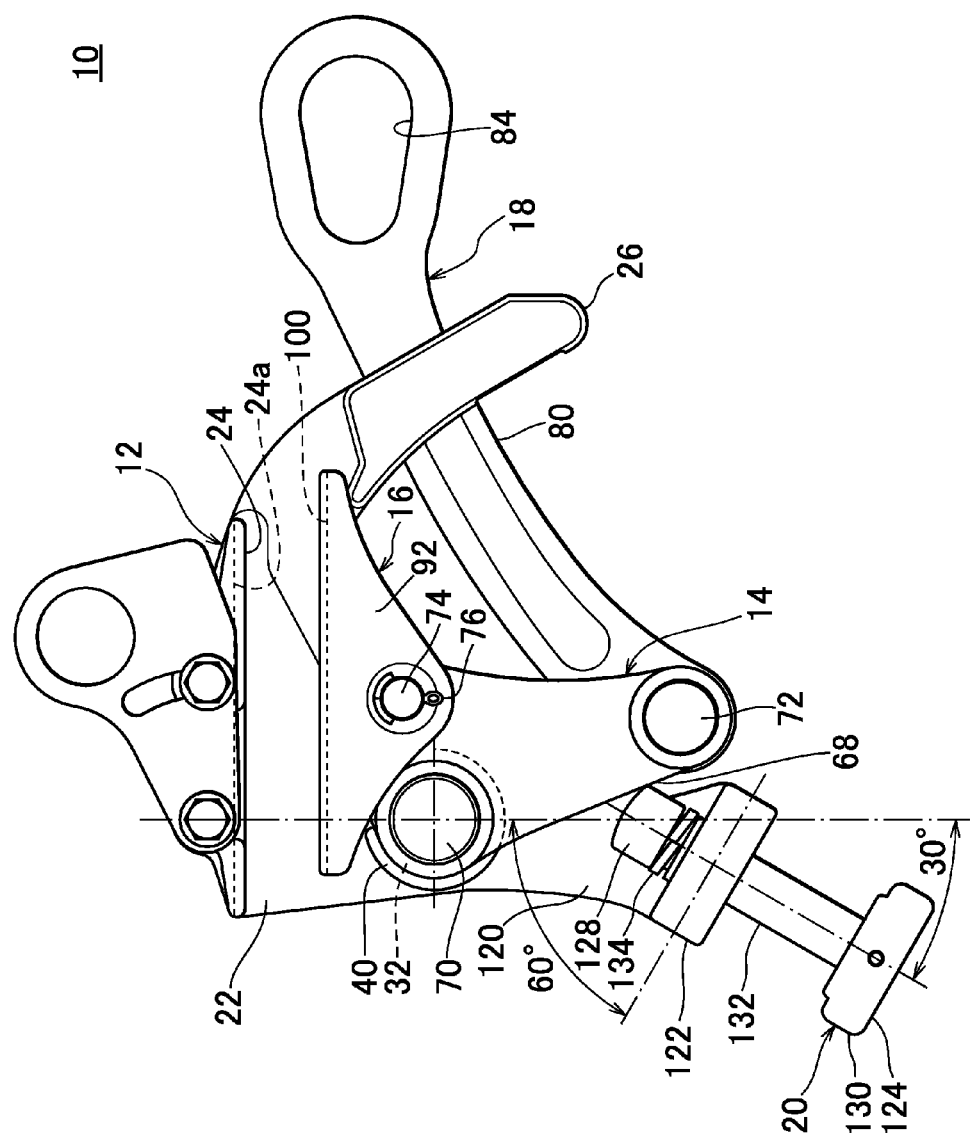

[FIG. 24B]
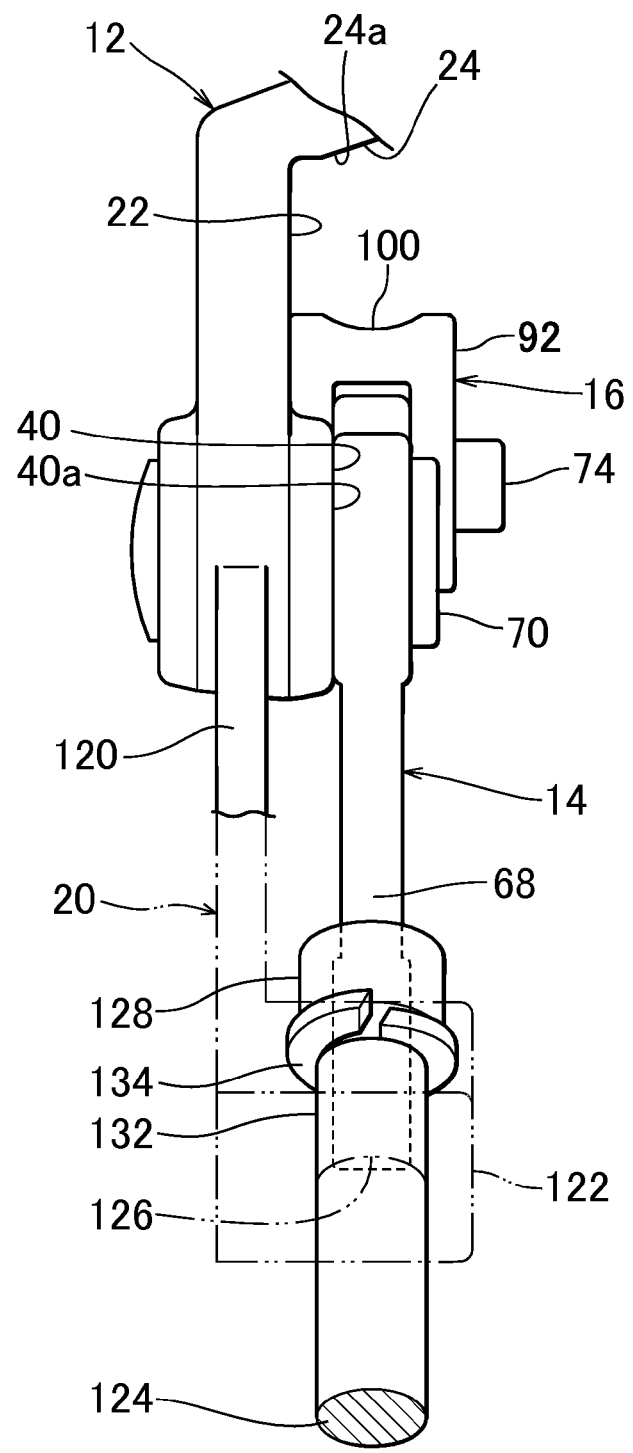
30° OPENING MAXIMUM

WIRE GRIPPER

CROSS-REFERENCE TO RELATED APPLICATION(S)

This application is a National Stage entry of International Patent Application No. PCT/JP2013/057594, filed Mar. 18, 2013, which claims the foreign priority of Japanese Patent Application No. 2012-217966, filed Sep. 28, 2012. The disclosures of the prior applications are hereby incorporated by reference in their entireties.

TECHNICAL FIELD

The present invention relates to a wire gripper which is attached to an apparatus for pulling a wire when a wire-allocating work or the like is performed and is used for an application for gripping a wire.

BACKGROUND ART

As a conventional typical wire gripper used when a wire, an electrical wire, a cable, or the like is wire-tensioned, for example, there is one shown in FIG. 2 and FIG. 3 of Patent Document 1. The wire gripper is composed of a first gripping piece 31 which has a gripping portion 31a, a second gripping piece 32 which is movable relative to the gripping portion 31a so as to come close to and separate from the gripping portion 31a, a second lever 34 which extends through the first gripping piece 31, whose both ends project from the first gripping piece 31 and which is slidably attached with the first gripping piece 31, and a first lever 33 which causes the second gripping piece 32 to move so as to come close to the gripping portion 31a and causes the second gripping piece 32 and the gripping portion 31a to grip a messenger wire W when the first gripping piece 31 slides forward of the second lever 34 and causes the second gripping piece 32 to separate from the first gripping portion 31a and releases the gripped state of the messenger wire W when the first gripping piece 31 slides rearward of the second lever 34.

In a state where the messenger wire W is being fed rearward, the messenger wire W is not gripped by a second gripper 3 and it is fed rearward through between the first and second gripping pieces 31 and 32.

At this time, regarding a rearward movement amount (a sliding amount) of the first gripping piece 31 to the second lever 34, the first gripper piece 31 is not moved so as to exceed a predetermined length by abutting an approximately lower end portion 31b of the first gripping portion 31 and a stopper 34c on each other, so that the messenger wire W is prevented from falling off between the gripping portion 31a and the second gripping piece 32 due to excessive separation of the gripping portion 31a and the second gripping piece 32 from each other.

PRIOR ART TECHNICAL DOCUMENT

Patent Document

Patent Document 1: Japanese Patent Application Laid-Open No. 2008-306797

SUMMARY OF INVENTION

Problem to be Solved by the Invention

In such a wire gripper, the second lever 34 is attached to the first lever 33 and the first lever 33 is swingably attached to the first gripping piece 31 by a shaft made of metal.

In the wire gripper, when the second lever 34 is pulled while a tension of an overhead power distribution line under construction is being held, an excessive force, for example, a shearing force, is applied to the shaft attached to the first lever 33 and the second griping piece 32.

On the other hand, a fitting work for causing the gripper portion 31a of the first gripping piece 31 and the second gripping piece 32 to grip the messenger wire W can be performed efficiently by making wide a size between the gripper portion 31a of the first gripping piece 31 and the second gripping piece 32. However, due to existence of the stopper 34, it is impossible to make wide the size for inserting the messenger wire W between the gripper portion 31a of the first gripping piece 31 and the second gripping piece 32.

Since the work using the wire gripper is a dangerous work performed at a high place, a wire gripper which can perform a work easily and safely is desired.

However, if such a configuration that the shaft or the like is made thick is adopted in order to increase robustness, the wire gripper is hard to be used as a wire gripper used at a high place due to increase of the weight of the wire gripper. When the size for inserting the messenger wire W between the gripper portion 31a of the first gripping piece 31 and the second gripping piece 32 is made wide, the messenger wire W becomes easy to come off.

Therefore, a main object of the present invention is to provide a wire gripper which is lightweight and can perform a work for holding a gripped state of a tensioned wire easily and safely.

Means for Solving Problem

A wire gripper of the present invention described in claim 1 is a wire gripper provided with a stationary gripping body having a wire-like body pressing-down portion; a swinging member swingably attached to the stationary gripping body by a supporting shaft; a movable gripping body swung toward the wire-like body pressing-down portion of the stationary gripping body according to swinging of the swinging member and having a wire-like body holding portion; a connection member connected to the swinging member by a swinging shaft and swinging the swinging member; and a swinging member restricting portion restricting an amount of swinging of the swinging member toward the side opposite to the side where the connection member extends, wherein the stationary gripping body is formed with a reinforced portion in a region thereof where a supporting shaft for attaching the swinging member is attached; the swinging member is provided with a front end edge from the vicinity of a supporting shaft hole in which the supporting shaft for attaching to the stationary gripping body is inserted up to the vicinity of a connection member attaching hole in which a swinging shaft for attaching the connection member is inserted between the supporting shaft hole and the connection member attaching hole; the front end edge of the swinging member is inclined toward a rear direction which is a direction of extension of the connection member according to coming close to the side of the connection member attaching hole; a connection member swinging shaft and a movable gripping body swinging shaft are positioned behind the supporting shaft in a rear direction which is a direction in which the connection member extends, the connection member swinging shaft is positioned below the supporting shaft, and the movable gripping body swinging shaft is positioned above the supporting shaft; the connection member extends below the wire-like body pressing-down portion of the stationary gripping body above the connection member swinging shaft; and a wire-like body clamped between the movable gripping body and the stationary gripping body is prevented from coming off between the movable gripping body whose movement amount is restricted by the swinging member restricting portion and the stationary gripping body.

A wire gripper of the present invention described in claim 2 is the wire gripper according to claim 1, wherein an inclination angle defined by a vertical line orthogonal to a direction in which the wire-like body gripped by the stationary gripping body and the movable gripping body extends and passing through the supporting shaft and a direction of pressing the front end edge of the swinging member by the swinging member restricting portion is an angle in a range between 30° and 90°.

A wire gripper of the present invention described in claim 3 is the wire gripper according to claim 1 or 2, wherein the swinging member restricting portion is provided with a pressing body attached to the stationary gripping body so as to be capable of advancing and retreating to the front end edge of the swinging member, and an inclination angle defined by a direction of pressing performed by the pressing body and the vertical line is an angle included between 30° and 90°.

A wire gripper of the present invention described in claim 4 is the wire gripper according to claims 1 to 3, wherein the stationary gripping body is provided with a circular ridge around a hole in which the supporting shaft for attaching the swinging member is inserted in order to protect the supporting shaft.

A wire gripper of the present invention described in claim 5 is the wire gripper according to claims 1 to 4, wherein another arc-shaped ridge is formed at a position spaced from a hole edge of the hole in which the supporting shaft is inserted along the supporting shaft hole edge separately from the circular ridge.

A wire gripper of the present invention described in claim 6 is the wire gripper according to claims 1 to 5 which is provided with a stationary gripping body having a wire-like body pressing-down portion; a swinging member swingably attached to the stationary gripping body by a supporting shaft; a movable gripping body swung toward the wire-like body pressing-down portion of the stationary gripping body according to swinging of the swinging member and having a wire-like body holding portion; and a connection member connected to the swinging member and swinging the swinging member, wherein the stationary gripping body is provided with a ridge extending toward the wire-like body pressing-down portion in the vicinity of a hole in which the supporting shaft for attaching the swinging member is inserted.

A wire gripper of the present invention described in claim 7 is the wire gripper according to claim 6, wherein the ridge is linear, and as the ridge, a plurality of ridges are provided at equal intervals from a hole edge of the hole.

A wire gripper of the present invention described in claim 8 is the wire gripper according to claims 4 to 7, wherein the circular ridge is provided on the side to which the connection member is attached, and/or the ridge extending toward the wire-like pressing-down portion is provided on the side opposite to the side to which the connection member is attached.

Effect of Invention

According to the present invention, since a wire gripper is provided with a stationary gripping body having a wire-like body pressing-down portion; a swinging member swingably attached to the stationary gripping body by a supporting shaft; a movable gripping body swung toward the wire-like body pressing-down portion of the stationary gripping body according to swinging of the swinging member and having a wire-like body holding portion; a connection member connected to the swinging member and swinging the swinging member; and a swinging member restricting portion restricting an amount of swinging of the swinging member toward the side opposite to the side where the connection member extends, wherein the stationary gripping body is formed with a reinforced portion in a region thereof where a supporting shaft for attaching the swinging member is attached; the swinging member is provided with a front end edge from the vicinity of a supporting shaft hole in which the supporting shaft for attaching to the stationary gripping body is inserted up to the vicinity of a connection member attaching hole in which a swinging shaft for attaching the connection member is inserted between the supporting shaft hole and the connection member attaching hole; the front end edge of the swinging member is inclined toward a rear direction which is a direction of extension of the connection member according to coming close to the side of the connection member attaching hole; a connection member swinging shaft and a movable gripping body swinging shaft are positioned behind the supporting shaft in a rear direction which is a direction in which the connection member extends, the connection member swinging shaft is positioned below the supporting shaft, and the movable gripping body swinging shaft is positioned above the supporting shaft; the connection member extends below the wire-like body pressing-down portion of the stationary gripping body above the connection member swinging shaft; and a wire-like body clamped between the movable gripping body and the stationary gripping body is prevented from coming off between the movable gripping body whose movement amount is restricted by the swinging member restricting portion and the stationary gripping body, a wire gripper which is lightweight and can perform a work for holding a gripped state of a tensioned wire easily and safely.

According to the invention described in claim 2, since an inclination angle defined by a vertical line orthogonal to a direction in which the wire-like body gripped by the stationary gripping body and the movable gripping body extends and passing through the supporting shaft and a direction of pressing the front end edge of the swinging member by the swinging member restricting portion is an angle in a range between 30° and 90°, restriction of movement of the swinging member can be performed effectively.

According to the invention described in claim 3, since the swinging member restricting portion is provided with a pressing body attached to the stationary gripping body so as to be capable of advancing and retreating to the front end edge of the swinging member, and an inclination angle defined by a direction of pressing performed by the pressing body and the vertical line is an angle included between 30° and 90°, restriction of movement of the swinging member can be performed effectively.

According to the invention described in claim 4, since the stationary gripping body is provided with a circular ridge around a hole in which the supporting shaft for attaching the swinging member is inserted in order to protect the supporting shaft, the stationary gripping body can be reinforced.

According to the invention described in claim 5, since another arc-shaped ridge is formed at a position spaced from a hole edge of the hole in which the supporting shaft is inserted along the hole edge separately from the circular ridge, the stationary gripping body can be reinforced.

According to the invention described in claim 6, since the wire gripper is provided with a stationary gripping body having a wire-like body pressing-down portion; a swinging member swingably attached to the stationary gripping body by a supporting shaft; a movable gripping body swung toward the wire-like body pressing-down portion of the stationary gripping body according to swinging of the swinging member and having a wire-like body holding portion; and a connection member connected to the swinging member and swinging the swinging member, wherein the stationary gripping body is provided with a ridge extending toward the wire-like body pressing-down portion in the vicinity of a hole in which the supporting shaft for attaching the swinging member is inserted, restriction of movement of the swinging member can be performed effectively.

According to the invention described in claim 7, since the ridge is linear, and as the ridge, a plurality of ridges are provided at equal intervals from a hole edge of the hole, the stationary gripping body can be reinforced.

According to the invention described in claim 8, since the circular ridge is provided on the side to which the connection member is attached, and/or the ridge extending toward the wire-like pressing-down portion is provided on the side opposite to the side to which the connection member is attached, the stationary gripping body can be reinforced.

The above object, and other objects, features, and merits of the present invention will be made further apparent from explanation of a mode for carrying out the invention made with reference to the drawings.

BRIEF DESCRIPTION OF THE DRAWINGS

FIG. 1 is a front illustration view showing a whole configuration of a wire gripper which is an embodiment according to the present invention;

FIG. 2 is a perspective illustration view showing constituent parts constituting the wire gripper shown in FIG. 1;

FIG. 3 is a front illustration view of a stationary gripping body;

FIG. 4 is a back illustration view of the stationary gripping body;

FIG. 5A a left side face illustration view of the stationary gripping body;

FIG. 5B is a left side face illustration view of the stationary gripping body where a portion of the stationary gripping body is shown in a section;

FIG. 6 is a perspective illustration view showing a main section of the stationary gripping body;

FIG. 7 is a front illustration view showing an operation state of the wire gripper;

FIG. 8 is a sectional illustration view showing an attached state of the stationary gripping body and a swinging member;

FIG. 9 is an illustration view taken in a direction of arrow in FIG. 7A;

FIG. 10 is an illustration view taken in a direction of arrow in FIG. 7A;

FIG. 11 is a side illustration view showing an attached state of the stationary gripping body and a movable gripping body;

FIG. 12 is a perspective illustration view showing an attached state of a biasing member;

FIG. 13 is a perspective illustration view showing an attached state of the biasing member;

FIG. 14 is a perspective illustration view showing an attached state of the biasing member;

FIG. 15 is a front illustration view of a wire gripper which is another embodiment according to the present invention;

FIG. 16 is a left side face illustration view of the wire gripper shown in FIG. 15;

FIG. 17 is a front illustration view of the stationary gripping body;

FIG. 18A is a front illustration view of a wire gripper;

FIG. 18B is a side face illustration view of the wire gripper;

FIG. 19A is a front illustration view of a wire gripper which is an embodiment;

FIG. 19B is a side face illustration view of the wire gripper which is the embodiment;

FIG. 20A is a front illustration view of a state where a clamping groove of a wire-like body pressing-down portion and a clamping groove of a movable gripping body of a wire gripper which is the embodiment are spaced from each other sufficiently;

FIG. 20B is a side face illustration view of the state where a clamping groove of a wire-like body pressing-down portion and a clamping groove of a movable gripping body of a wire gripper which is the embodiment are spaced from each other sufficiently;

FIG. 21A is a front illustration view of a wire gripper which is an embodiment;

FIG. 21B is a side face illustration view of the wire gripper which is the embodiment;

FIG. 22A is a front illustration view of a state where a clamping groove of a wire-like body pressing-down portion and a clamping groove of a movable gripping body of a wire gripper which is the embodiment are spaced from each other sufficiently;

FIG. 22B is a side face illustration view of the state where a clamping groove of a wire-like body pressing-down portion and a clamping groove of a movable gripping body of a wire gripper which is the embodiment are spaced from each other sufficiently;

FIG. 23A is a front illustration view of a wire gripper which is an embodiment;

FIG. 23B is a side face illustration view of the wire gripper which is the embodiment;

FIG. 24A is a front illustration view of a state where a clamping groove of a wire-like body pressing-down portion and a clamping groove of a movable gripping body of a wire gripper which is the embodiment are spaced from each other sufficiently; and FIG. 24B is a side face illustration view of the state where a clamping groove of a wire-like body pressing-down portion and a clamping groove of a movable gripping body of a wire gripper which is the embodiment are spaced from each other sufficiently.

MODE FOR CARRYING OUT THE INVENTION

Embodiments of the present invention will be described below with reference to the drawings, and it will be submitted for understanding of the present invention. It should be noted that the embodiment described below is one embodied example and it does not limit the technical scope of the present invention.

A wire gripper 10 which is an embodiment of the present invention is provided with a stationary gripping body 12 having a wire-like body pressing-down portion 24; a swinging member 14 swingably attached to the stationary gripping body 12 by a supporting shaft 70; a movable gripping body 16 swung toward the wire-like body pressing-down portion 24 of the stationary gripping body 12 according to swinging of the swinging member 14 and having a wire-like body holding portion; a connection member 18 connected to the swinging member 14 and swinging the swinging member 14, and a swinging member restricting portion 20 restricting an amount of swinging of the swinging member 14 toward the side opposite to the side where the connection member 18 extends.

The stationary gripping body 12 is provided with a wire-like body pressing-down portion 24 extending in a longitudinal direction thereof at an upper portion of a main body 22 thereof U-shaped in a front view and projecting toward a near side, and it is provided with a connection member guiding portion 26 at a rear portion of the main body 22 so as to project rearward of a lower portion of the main body 22.

The wire-like body pressing-down portion 24 has an eaves shape projecting toward a near side of the main body 22 and it is formed with a clamping groove 24a on a lower face thereof.

The connection member guiding portion 26 extends in parallel to a line in which the wire-like body pressing-down portion 24 extends on an extension line on which the wire-like body pressing-down portion 24 extends.

The connection member guiding portion 26 is bored with a guide hole 28 inserted with the connection member 18 to guide the connection member 18, and the connection member 18 swingably pivoted to the swinging member 14 is inserted in the guide hole 28 and is held by the connection member guiding portion 26.

The stationary gripping body 12 is provided with a supporting shaft hole 30 for pivoting the swinging member 14 by a supporting shaft 70 at a vertically-extending portion of the main body 22 at the front portion so as to extend through the vertically-extending portion.

The supporting shaft hole 30 is a circular hole bored from a near side (a front face side) of the main body 22 to a far side (a back face side) and it extends horizontally.

The stationary gripping body 12 is provided with a ridge 32 around a hole edge of the supporting shaft hole 30 so as to project along the hole edge in order to protect the supporting shaft 70 pivoting the swinging member 14.

The ridge 32 is a circular rib in a front view and continuously provided from a lower portion of the supporting shaft hole 30 to a rear side thereof through a front side and an upper portion thereof.

The ridge 32 projects from the main body 22 in a direction where an outer peripheral edge of the hole of the shaft-supporting hole 30 extends (a direction where an axial center 70a of the supporting shaft 70 extends).

The ridge 32 has a top portion 32a which is planar and spreads in a vertical direction which is a direction intersecting a direction where a hole peripheral edge of the supporting shaft hole 30 extends. The ridge 32 has an approximately trapezoidal shape in a section where the top portion 32a is provided with a flat face parallel to a near-side face of the main body 22 and the clamping groove 24a of the wire-like body pressing-down portion 24 and a peripheral edge of the top portion 32a extends in a direction of intersecting the near-side face of the main body 22. The ridge 32 is configured such that a height thereof has a length approximately equal to a width of the main body 22, and it has approximately the same sectional shape and approximately the same height over a whole circumstance thereof.

The ridge 32 is formed in a taper shape where the width thereof gradually becomes narrower toward an upper end (the top portion 32a), and a width of a lower end portion thereof is approximately equal to the width of the main body 22.

The ridge 32 constitutes a seat on which the swinging member 14 is placed.

The ridge 32 is formed integrally with the main body 22 from metal.

Another arc-shaped ridge 40 is formed at a position spaced from the hole edge of the supporting shaft hole 30 in which the supporting shaft 70 is inserted along the hole edge separately from the ridge 32.

The arc-shaped ridge 40 is an arc-shaped rib in a plan view continuously provided from a lower portion of the supporting shaft hole 30 to a front side thereof.

The ridge 40 projects from the main body 22 in the direction where the outer peripheral edge of the hole of the supporting shaft hole 30 extends (the direction where the axial center 70a of the supporting shaft 70 extends).

The ridge 40 is cut off at a lower portion thereof in a rear direction [a direction of pulling the connection member 18 (the direction "a" shown in FIG. 18)], so that it is provided with a space 42 for allowing movement of a spring.

The ridge 40 is configured in a circular shape concentric with the ridge 32 so as to surround the ridge 32 and space from the outer peripheral edge of the ridge 32 by approximately the same distance, so that a spring groove 44 is formed between the ridge 40 and the ridge 32.

The ridge 40 has a top portion 40a which is planar and spreads in a vertical direction which is a direction intersecting a direction where a hole peripheral edge of the supporting shaft hole 30 extends. The ridge 40 has an approximately trapezoidal shape in a section where the top portion 40a is provided with a flat face parallel to a near-side face of the main body 22 and the clamping groove 24a of the wire-like body pressing-down portion 24, and a peripheral edge of the top portion 40a extends in a direction of intersecting the near-side face of the main body 22.

The ridge 40 has a height approximately equal to the height of the ridge 32, it is configured such that the height has a length approximately equal to the width of the main body 22, and it has approximately the same sectional shape and approximately the same height over a whole circumstance thereof.

The ridge 40 is formed in a taper shape where the width thereof gradually becomes narrower toward an upper end (the top portion 40a), and a width of a lower end portion thereof is approximately equal to the width of the main body 22.

The ridge 40 constitutes a seat on which the swinging member 14 is placed.

The ridge 40 is formed integrally with the main body 22 from metal.

The stationary gripping body 12 is provided with a plurality of linear ridges in the vicinity of the supporting shaft hole 30 in which the supporting shaft 70 for attaching the swinging member 14 on an opposite face of the stationary gripping body 12 of the face on which the ridge 32 and the ridge 40 have been formed. In this embodiment, a first linear ridge 50 and a second linear ridge 52 extending from the lower portion of the vertically-extending portion toward the wire-like body pressing-down portion 24 are provided on the vertically-extending portion of the main body 22 at a proper interval.

The first linear ridge 50 and the second linear ridge 52 are linear, and top portions thereof are planar, they have approximately trapezoidal shapes in a section where the top portions are provided with a flat face parallel to the near-side face of the main body 22, they are configured such that the heights thereof have lengths approximately equal to width of the main body 22, and they each have approximately the same sectional shape and approximately the same height over whole circumstances thereof.

The first linear ridge 50 and the second linear ridge 52 are provided so as to be spaced from the hole edge of the supporting shaft hole 30 by a proper distance and are provided in parallel to each other. The same interval is set between the first linear ridge 50 and the supporting shaft hole 30 and between the second linear ridge 52 and the supporting shaft hole 30. The first linear ridge 50 and the second linear ridge 52 extend in a direction intersecting a direction of pulling the connection member 18 (the direction "a" shown in FIG. 18).

The circular ridge 32 is provided on the vertically-extending portion of the main body 22 on the side of attaching the connection member 18 (the side of attaching the swinging member 14), while the first linear ridge 50 and the second linear ridge 52 extending toward the wire-like body pressing-down portion 24 are provided on the vertically-extending portion of the main body 22 on the opposite face of the side of attaching the connection member 18.

The swinging member 14 has an approximately triangular shape in a front view, and it is configured such that an inner angle portion at a front upper portion thereof is bored with a stationary gripping body attaching hole 60 in which the supporting shaft 70 is inserted, an inner angle portion at a rear upper portion thereof is bored with a movable gripping body attaching hole 62 in which a swinging shaft 74 is inserted, and an inner angle portion at a rear lower portion thereof is bored with a connection member attaching hole 64 in which a swinging shaft 72 is inserted.

The swinging member 14 is provided with a front end edge 68 extending from the vicinity of the supporting shaft hole 30 to the vicinity of the connection member attaching hole 64 between the stationary gripping body attaching hole in which the supporting shaft 70 for attaching to the stationary gripping body 12 is inserted and the connection member attaching hole 64 in which the connection member swinging shaft 72 attached with the connection member 18 is inserted. The front end edge 68 of the swinging member 14 is inclined toward a rearward direction which is a direction in which the connection member 18 extends (in a counterclockwise direction) from the side of the stationary gripping body attaching hole above the front end edge 68 toward the side of the connection member attaching hole 64 below the front end edge 68.

The connection member swinging shaft 72 and the movable griping body swinging shaft 74 are positioned behind the supporting shaft 70 in a rear direction (on the right side) which is the direction in which the connection member 18 extends, the connection member swinging shaft 72 is positioned below the supporting shaft 70, the movable gripping body swinging shaft 74 is positioned above the supporting shaft 70, and the connection member 18 extends above the connection member swinging shaft 72 below the wire-like body pressing-down portion 24 of the stationary gripping body 12.

Portions around the stationary gripping body attaching hole 60, the movable gripping body attaching hole 62 and the connection member attaching hole 64 bulge on both the near-side face and the far-side face of the swinging member 14 so as to be higher than the other portion of the swinging member 14, and top portions of the bulging portions are vertical flat faces orthogonal to a direction where the peripheral edges of the holes extent. That is, a top portion 60a of the bulging portion around the far-side hole of the stationary gripping body attaching hole 60 and a top portion 60b of the bulging portion around the near-side hole of the stationary gripping body attaching hole 60, a top portion 62a of the bulging portion around the far-side hole of the movable gripping body attaching hole 62 and a top portion 62b of the bulging portion around the near-side hole of the movable gripping body attaching hole 62, and a top portion 64a of the bulging portion around the far-side hole of the connection member attaching hole 64 and a top portion 64b of the bulging portion around the near-side hole of the connection member attaching hole 64 are formed in parallel and they are orthogonal to a direction where the hole edges (outer peripheral edges of the holes) of the stationary gripping body attaching hole 60, the movable gripping body attaching hole 62 and the connection member attaching hole 64 extend.

A sliding contact face of the top portion 60a of the bulging portion around the far-side hole formed around the near side of the stationary gripping body attaching hole 60 (a sliding face coming in sliding contact with the top portion 32a of the ridge 32 and the top portion 40a of the ridge 40) is formed on a vertical face so as to be orthogonal to the rotation axis (an axial center of the supporting shaft 70) of the swinging member 14 and be parallel to the clamping groove 24a of the stationary gripping body 12 and the clamping groove 100 of the movable gripping body 16.

Sliding contact faces of the top portions 62a of the bulging portions around the far side hole and the top portion 62b of the bulging portion around the near side hole formed around the far-side and the near-side of the movable gripping body attaching hole 62 (sliding contact faces coming in contact with the attaching faces of the movable gripping body 16) are formed on vertical faces so as to be orthogonal to the rotation axis of the movable gripping body 16 (an axial center of the movable gripping body swinging shaft 74) and be parallel to the clamping groove 24a of the stationary gripping body 12 and the clamping groove 100 of the movable gripping body 16.

A sliding contact face of the top portion 64a of the bulging portion around the far-side hole formed around the far-side of the connection member attaching hole 64 (a sliding contact face coming in sliding contact with the attaching face of the connection member 18) is formed on a vertical face so as to be orthogonal to the rotation axis of the connection member 18 (an axial center of the connection member swinging shaft 72) and be parallel to the clamping groove 24a of the stationary gripping body 12 and the clamping groove 100 of the movable gripping body 16.

The swinging member 14 is joined to the ridge 32 provided on the stationary gripping body 12, and the supporting hole 30 and the stationary gripping body attaching hole 60 are aligned with each other, so that the swinging member 14 is swingably attached to the fixing gripping body 12 at one end portion of the swinging member 14 by the supporting shaft 70 serving as a pivoting shaft.

The swinging member 14 is swung in parallel with a direction in which the wire-like body pressing-down portion 24 of the stationary gripping body 12 extends.

The swinging member 14 is swingably attached with the connection member 18 by the connection member swinging shaft 72 in such a state that one end of the connection member 18 is joined to another end portion of the swinging member 14 and a swinging member attaching hole 82 of the connection member 18 and the connection member attaching hole 64 of the swinging member 14 are aligned with each other.

Further, the swinging member 14 is swingably attached with the movable gripping body 16 by the movable gripping body swinging shaft 74 in the movable gripping body attaching hole 62 provided at a position adjacent to the stationary gripping body attaching hole 60.

The connection member 18 is a rod-shaped body having a longitudinal direction, where a swinging member attaching hole 82 is bored at a front portion of a prismatic connection member main body 80 and a connection hole 84 is formed at a rear portion of the connection member main body 80.

The connection member attaching hole 64 of the swinging member 14 and the swinging member attaching hole 82 of the connection member 18 have the same diameter, and the swinging member 14 and the connection member 18 are arranged in parallel such that outer peripheral edges of the hole are parallel to each other. The connection member 18 is swingably attached to the swinging member 14 by the swinging shaft 72 penetrating the main body 22 from the connection member attaching hole 64 of the swinging member 14 into the swinging member attaching hole 82 of the connection member 18.

The guide hole 28 of the stationary gripping body 12 is formed so as to have a height approximately equal to the height of the supporting shaft hole 30, and the stationary gripping body attaching hole 60 of the swinging member 14 is formed to have a height approximately equal to those of the supporting shaft hole 30 and the guide hole 28 of the stationary gripping body 12. Therefore, the connection member 18 attached to the connection member attaching hole 64 formed below the stationary gripping body attaching hole 60 of the swinging member 14 is inserted through the connection member 18 of the stationary gripping body 12 to rise toward the side of pulling the connection member 18 (the direction "a" shown in FIG. 15).

The connection member 18 may be brought into contact with an opening edge of the guide hole 28 on the side of pulling the connection member 18 (the direction "a" shown in FIG. 18) which is on a side departing from the supporting shaft hole 30 such that a force acting on the connection member main body 80 of the connection member 18 becomes small.

The supporting shaft 70 has a cylindrical shape having an axial center 70a extending in a lengthwise direction, and it is provided with a flange portion 70b projecting in a direction intersecting the axial center 70a at a near side thereof. The supporting shaft 70 is inserted into the fixed gripping body attaching hole 60 of the swinging member 14, a flange portion 70b is joined around the stationary gripping body attaching hole 60 and it is screwed to the supporting shaft hole 30 of the stationary gripping body 12, so that it is attached to the stationary gripping body 12 and the swinging member 14. The axial center 70a of the supporting shaft 70 constitutes the center of rotation of the swinging member 14. The supporting shaft 70 may be caulked on the far-side of the supporting shaft hole 30.

The connection member swinging shaft 72 has a cylindrical shape having an axial center 72a extending in a lengthwise direction, and it is provided with a flange portion 72b projecting in a direction intersecting the axial center 72a on a near side thereof. The connection member swinging shaft 72 is fitted in the connection member attaching hole 64 of the swinging member 14 from the near side thereof, it is fitted into the swinging member attaching hole 82 of the connection member 18 from the near side, it is caulked on the far side of the swinging member attaching hole 82, so that it is attached to the swinging member 14 and the connection member 18. The axial center 72a of the swinging shaft 72 constitutes the center of rotation of the connection member 18.

The movable gripping body swinging shaft 74 has a cylindrical shape having an axial center 74a extending in a lengthwise direction, and it is provided with a flange portion 74b projecting in a direction intersecting the axial center 74a on the far side. The movable gripping body swinging shaft 74 is inserted from the other swinging member attaching hole 98 of the movable gripping body 16 on the far side into the movable gripping body attaching hole 62 of the swinging member 14 and it is inserted into one swinging member attaching hole 96, the flange portion 74b is joined around the other swinging member attaching hole 98 and it is fixed by a cotter pin 76 in a region projecting on the near side of the one swinging member attaching hole 96 on the near side of the movable gripping body 16. The axial center 74a of the swinging shaft 74 constitutes the center of rotation of the movable gripping body 16.

An outer periphery of the other swinging member attaching hole 98 on the far side has a step difference formed in an annular shape in a circumferential direction. The surface of the flange portion 74b of the movable gripping body swinging shaft 74 on the far side is constituted such that when the flange portion 74b of the movable gripping body swinging shaft 74 is inserted into the annular step difference portion 98a, the surface of the flange portion 74b becomes flush with the far-side face of the other swinging member attaching portion 94.

The supporting shaft hole 30 and the fixed griping body attaching hole 60 of the swinging member 14 have the same diameter, and they are arranged in parallel such that outer peripheral edges thereof are parallel to each other.

A direction of extension of the peripheral edge of the supporting shaft hole 30 and a direction of extension of the peripheral edges of the stationary gripping body attaching hole 60, the movable gripping body attaching hole 62 and the connection member attaching hole 64 are parallel to each other, the direction of extension of the peripheral edge of the supporting shaft hole 30 and the direction of extension of the peripheral edges of the stationary gripping body attaching hole 60, the movable gripping body attaching hole 62 and the connection member attaching hole 64 are parallel to the axial center 70a of the supporting shaft 70, the axial center 72a of the connection member swinging shaft 72, and the axial center 74a of the movable gripping body swinging shaft 74.

A biasing member 110 composed of a coil spring for biasing the swinging member 14 to the side where the connection member 18 is pulled is provided between the stationary gripping body 12 and the swinging member 14.

The biasing member 110 is arranged such that a coil portion 112 thereof is fitted into a spring groove 44 of the stationary gripping body 12.

The biasing member 110 is arranged such that a linear first hooking portion 114 extending from the coil portion 112 on the near side is fixed to a catching hole 66 of the swinging member 14 formed on the far-side face, and a linear second hooking portion 116 extending from the coil portion 112 on the far side is fixed to a catching hole 48 of the stationary gripping body 12 formed on the near-side face of the main body 22.

The first hooking portion 114 is fixed in the catching hole 66 of the swinging member 14 in a state where the connection member 18 has been pulled in a non-loaded state, and the biasing member 110 biases the connection member 18 in such a state that the connection member 18 has been pulled from a side of pushing back the connection member 18 in a pulling-back direction (the direction "b" shown in FIG. 18) to a side of pulling the connection member 18 (the direction "a" shown in FIG. 18).

The ridge 40 of the stationary gripping body 12 is not formed within an operation range of the first hooking portion 114, it is provided with a space 42, and it is provided so as to extend from a lower portion of the supporting shaft hole 30 to a front portion thereof.

As shown in FIG. 11, the movable gripping body 16 is formed in a U shape in a section, it is provided with one swinging member attaching portion 92 and the other swinging member attaching portion 94 arranged in parallel before and after, and the one swinging member attaching hole 96 is bored in the one swinging member attaching portion 92, while the other swinging member attaching hole 98 is bored in the other swinging member attaching portion 94.

The movable gripping body 16 is formed with the clamping groove 100 receiving a lower portion of a wire-like body W on an upper face thereof such that the clamping groove 100 faces the clamping groove 24a formed on the lower face of the stationary gripping body 12.

The movable gripping body 16 is attached to the swinging member 14 such the one swinging member attaching portion 92 and the other swinging member attaching portion 94 are caused to stride over an upper portion of a rear portion of the swinging member 14, and the one swinging member attaching hole 96, the other swinging member attaching hole 98, and the movable gripping body attaching hole 62 of the swinging member 14 are aligned with one another in parallel.

The movable gripping body 16 is swingably attached to the swinging member 14 by the movable gripping body swinging shaft 74 inserted into the one swinging member attaching portion 96, the other swinging member attaching portion 98 and the movable gripping body attaching hole 62 which are aligned with one another.

The movable gripping body attaching hole 62 of the swinging member 14, and the one swinging member attaching hole 96 and the other swinging member attaching hole 98 of the movable gripping body 16 have the same diameter and they are arranged such that outer peripheral edges of their holes are in parallel.

The one swinging member attaching portion 92 and the other swinging member attaching portion 94 are attached to the swinging member 14 such that faces thereof opposed to each other are vertical faces and the faces are parallel to the top portion 32a of the ridge 32 and the top portion 40a of the ridge 40.

The faces of the one swinging member attaching portion 92 and the other swinging member attaching portion 94 facing each other (inner faces of the one swinging member attaching portion 92 and the other swinging member attaching portion 94) are orthogonal to directions of extensions of the outer peripheral edges of the holes of the one swinging member attaching hole 96 and the other swinging member attaching hole 98 and are orthogonal to the axial center 74a of the movable gripping body swinging shaft 74.

The movable gripping body 16 attached to the swinging member 14 is swung about the axial center 74a of the movable gripping body swinging shaft 74.

A swinging range of the movable gripping body 16 can be set to swinging in such a degree that deviation from a state that an upper face of the movable gripping body 16 becomes parallel to the lower face of the wire-like body pressing-down portion 24 of the stationary gripping body 12 due to swinging of the swinging member 14 is corrected, so that the swinging range is restricted.

The movable gripping body 16 is attached to the swinging member 14 such that the clamping groove 100 thereof is positioned just below the clamping groove 24a of the stationary gripping body 12 and the clamping groove 100 of the movable gripping body 16 and the clamping groove 24a of the stationary gripping body 12 face each other.

The swinging member 14 is attached to the near side of the top portion 32a of the ridge 32 and the near side of the top portion 40a of the ridge 40 of the stationary gripping body 12 such that the clamping groove 100 of the movable gripping body 16 attached to the swinging member 14 is positioned just below the clamping groove 24a of the stationary gripping body 12 and the clamping groove 100 of the movable gripping body 16 and the clamping groove 24a of the stationary gripping body 12 face each other.

The connection member 18 is attached to the swinging member 14 such that the connection member main body 80 are parallel to the top portion 32a of the ridge 32 and the top portion 40a of the ridge 40 and extends along a direction where the clamping groove 24a of the stationary gripping body 12 and the clamping groove 100 of the movable gripping body 16 extend below the ridge 32 and the ridge 40 of the stationary gripping body 12. The connection member 18 is swung about the axial center 72a of the connection member swinging shaft 72.

The ridge 32 and the ridge 40 of the stationary gripping body 12 are formed to have fixed heights such that the near-side faces thereof (the sliding contact faces of the top portion 32a and the top portion 40a facing the top portion 60a of the bulging portion around the hole of the stationary gripping body attaching hole 60 of the swinging member 14) are parallel to a direction in which the clamping groove 24a of the stationary gripping body 12 extends and are orthogonal to the axial center 70a of the supporting shaft 70 below the clamping groove 24a of the stationary gripping body 12.

The sliding contact faces of the top portion 32a of the ridge 32 and the top portion 40a of the ridge 40 are parallel faces facing the sliding contact faces of the top portions of the bulging portions around the holes of the stationary gripping body attaching hole 60, the movable gripping body attaching hole 62 and the connection member attaching hole 64 (the top portion 60a of the bulging portion around the far-side hole, the top portion 62a of the bulging portion around the far-side hole, the top portion 64a of the bulging portion around the far-side hole, the top portion 60b of the bulging portion around the near-side hole, the top portion 62b of the bulging portion around the near-side hole, and the top portion 64b of the bulging portion around the near-side hole). Then the top portion 32a of the ridge 32, the top portion 40a of the ridge 40, and the bulging portion around the stationary gripping body attaching hole 60 (the top portion 60a of the bulging portion around the far-side hole) are in surface contact with each other so as to swing the swinging member 14 about the axial center 70a of the swinging shaft 70.

A vertical plane face $P_1$ coming in contact with the top portion 32a of the ridge 32 and the top portion 40a of the ridge 40 is configured so as to passing inside the guide hole 28 of the connection member guiding portion 26.

A vertical plane face $P_2$ passing through the near-side face of the swinging member 14 around the stationary gripping body attaching hole 60 and the near-side face thereof around the movable gripping body attaching hole 62 (the sliding contact face of the top portion 62b of the budging portion around the near-side hole) and a vertical plane face $P_3$ passing through the far-side face of the swinging member 14 around the stationary gripping body attaching hole 60 and the far-side face thereof around the movable gripping body attaching hole 62 (the sliding contact face of the top portion 62a of the bulging portion around the far-side hole) are perpendicular to the axial center 70a of the swinging shaft 70, the axial center 72a of the connection member swinging shaft 72 and the axial center 74a of the movable gripping body swinging shaft 74 and are parallel to the clamping groove 24a of the stationary gripping body 12. Such a configuration is adopted that the vertical plane face $P_3$ passing through the far-side face of the swinging member 14 around the stationary gripping body attaching hole 60 and the far-side face of the movable gripping body attaching hole 62 attached with the connection member 18 (the sliding contact face of the top portion 64a of the bulging portion around the far-side hole) is perpendicular to the axial center 70a of the swinging shaft 70, the axial center 72a of the connection member swinging shaft 72 and the axial center 74a of the movable gripping body swinging shaft 74 and passes through inside of the guide hole 28 of the connection member guiding portion 26.

The plane face $P_1$ coming in contact with the top portion 32a of the ridge 32 and the top portion 40a of the ridge 40, the plane face $P_2$ passing through the near-side face around the movable gripping body attaching hole 62 (the sliding contact face of the top portion 62b of the bulging portion around the near-side hole), and the plane face $P_3$ passing through the far-side face around the stationary gripping body attaching hole 60 (the sliding-contact face of the top portion 60a of the bulging portion around the far-side hole) and the far-side face around the movable gripping body attaching hole 62 (the sliding-contact face of the top portion 62a of the bulging portion around the far-side hole) are parallel to each other, and they constitute vertical faces to the axial center 70a of the swinging shaft 70, the axial center 72a of the connection member swinging shaft 72 and the axial center 74a of the movable gripping body swinging shaft 74.

The swinging member restricting portion 20 is provided with a guiding portion 122 formed in a support portion 120 provided in the stationary gripping body 12 and a pressing body 124 attached to the guiding portion 122 such that the pressing body 124 can advance and retreat.

The guiding portion 122 is formed with a female screw hole 126, while the pressing body 124 is provided with an abutting portion 128 at a distal end thereof.

The pressing body 124 can be moved so as to advance and retreat according to screwing with the female screw hole 126 by rotationally operating a grip portion 130 fixed to a rear end of the pressing body 124.

The pressing body 124 is formed with a male screw portion 132 screwed to the female screw hole 126 of the guiding portion 122 and an abutting portion 128 attached to a distal end side of the male screw portion 132 so as to be capable of advancing and retreating.

As shown in FIG. 3, since the abutting portion 128 is biased toward the distal end side by a spring washer 134, the abutting portion 128 reaches such a state that it has advanced and moved up to a position of abutting on the front end edge 68 of the swinging member 14.

When the pressing body 124 is moved so as to advance by rotationally operating the grip portion 130 in a state where the wire-like body W has been gripped by the wire-like body pressing-down portion 24 of the stationary gripping body 12 and the movable gripping body 16 and it is further moved from a state where the abutting portion 128 at the distal end has been caused to abut on an edge portion of the front end edge 68 of the swinging member 14, the abutting portion 128 is moved so as to retreat to reach a state of compressing the spring washer 134, as shown in FIG. 1.

The pressing body 124 is configured such that an inclined angle $\alpha$ defined by a vertical line $L_1$ orthogonal to a direction of extension of the wire-like body W gripped by the stationary gripping body 12 and the movable gripping body 16 and passing through the supporting shaft 70 and a direction $L_2$ of pressing the front end edge 68 of the swinging member 14 by the swinging member restricting portion 20 falls in an angle in a range between 30° and 90°.

When the inclined angle $\alpha$ is an angle in a range between 30° and 90°, a gripped state of the wire-like body W can be maintained securely.

The swinging member restricting portion 20 is provided with the pressing body 124 attached to the stationary gripping body 12 so as be capable of advancing and retreating toward the front end edge 68 of the swinging member 14, and it is configured such that an inclined angle $\alpha$ defined by a direction of pressing performed by the pressing body 124 and the vertical line (orthogonal to the direction of extension of the wire-like body W gripped by the stationary gripping body 12 and the movable gripping body 16 and passing through the supporting shaft 70) is in a range between 30° and 90°, the swinging member 14 is configured such that the vertical line $L_1$ and a pulled direction $L_4$ of the swinging member 14 which is a direction in which the connection member 18 extends are orthogonal to each other, and an angle $\beta$ defined by the vertical line $L_1$ and a line $L_3$ connecting the center of the connection member swinging shaft 72 and the center of the supporting shaft 70 is in a range between 35° and 55°.

When the wire-like body W is thick, the angle $\beta$ being closer to 35° is suitable for maintaining the gripped state of the wire-like body W, and when the wire-like body W is thin, the angle $\beta$ being closer to 55° is suitable for maintaining the gripped state of the wire-like body W.

A procedure for attaching and detaching the wire gripper 10 constituted above to and from the wire-like body W will be described below.

First of all, regarding the swinging member restricting portion 20, a state where the pressing body 124 has been retreated by rotating the grip portion 130 is achieved, as shown in FIG. 7, a state where swinging of the swinging member 14 in the other direction (forward) has been allowed is achieved, and a state where the movable gripping body 16 has been spaced from the stationary gripping body 12 sufficiently is achieved, so that it is made easy to insert the wire-like body W between the wire-like body pressing-down portion 24 of the stationary gripping body 12 and the movable gripping body 16.

A state where the movable gripping body 16 has been separated from the stationary gripping body 12 sufficiently by pressing the connection member 18 to a pressing-back side (the direction "b" shown in FIG. 18) is achieved, so that it is made easy to insert the wire-like body W between the stationary gripping body 12 and the movable gripping body 16.

As shown in FIG. 7, the wire gripper 10 put in the state where the stationary gripping body 12 and the movable gripping body 16 have been spaced from each other sufficiently is carried to a predetermined region of the wire-like body W, and the wire-like body W is inserted between the stationary gripping body 12 and the movable gripping body 16, so that an upper portion of the wire-like body W is received in the clamping groove 24a formed on the lower face of the stationary gripping body 12 and a state where the wire gripper 10 has been hung by the wire-like body W is achieved.

When the attaching of the wire gripper 10 to the wire-like body W is applied to an electrical wire-allocating work, the wire grippers 10 are attached to two portions of a wire at an interval corresponding to a length of a wire-tensioning apparatus functioning to pull up an electrical wire from both sides of the wire-tensioning apparatus, respectively. Connecting means for connecting to the wire gripper 10 utilizing a connection hole 84 formed in the connection member 18 are provided at both ends of the wire-tensioning apparatus. After the wire-tensioning apparatus is connected to the wire grippers 10 positioned on the both sides at both the ends thereof, a force of pulling the electrical wire in the direction "a" shown in FIG. 18 is applied to the connection members 18 of the wire grippers 10 according to an operation for shortening the length between the both ends.

When the connection member 18 is pulled in the direction "a" shown in FIG. 18, the swinging member 14 connected with one end side of the connection member 18 is swung in a direction "c" shown in FIG. 18 about the supporting shaft 70. According to the swinging of the swinging member 14, the movable gripping body 16 is pushed up in the direction of the stationary gripping body 12 and a lower portion of the wire-like body W is received in the clamping groove 100, so that the wire-like body W is clamped between the movable gripping body 16 and the stationary gripping body 12 to be gripped there between, as shown in FIG. 1.

When a pulling force in the direction "a" shown in FIG. 18 is further applied to the electrical wire by the wire-tensioning apparatus, since the wire-like body W gripped by the wire gripper 10 is pulled in direction "a" shown in FIG. 18, the wire grippers 10 on the both sides are pulled up to each other, and a portion of the wire-like body W positioned between the wire grippers 10 on the both sides is put in a loosened state, so that a state where the electrical wire-allocating work can be carried out is obtained.

When change from the initially fixed state has occurred regarding the swinging angle of the swinging member 14 in this manner, the swinging member restricting portion 20 moves the abutting portion 128 in an advancing manner by biasing of the spring washer 134 to maintain the state where the abutting portion 128 has abutted on the swinging member 14. Since the change of the swinging angle of the swinging member 14 can be detected visually as the change of the spring washer 134, a worker can return the change after leaving to the initial state when change has occurred in the spring washer 134 by rotating the grip portion 130 to move the pressing body 124 in an advancing manner and performing adjustment such that the spring washer 134 becomes flat.

When the wire gripper 10 attached to the wire-like body W is detached therefrom, the movable gripping body 16 is separated from the wire-like body W by releasing the connected state achieved by the wire-tensioning apparatus which has been connected to the connection member 18 or the like and rotating the grip portion 130 of the swinging member restricting portion 20 to move the pressing body 124 in a retreating manner and release pressing on the swinging member 14, so that gripping of the wire-like body W is released.

As described above, in the attaching work of the wire gripper 10, a work of attaching the wire grippers 10 to the wire-like body W and a work of connecting the pulling means such as the wire-tensioning apparatus to the connection members 18 can be all performed on a front face side, so that the work for allocating a wire or the like is a high place work, and the work which is also a dangerous work can be performed easily and safely.

When the wire gripper 10 attached to the wire-like body W is detached therefrom, the movable gripping body 16 is separated from the wire-like body W by releasing the connected state achieved by the wire-tensioning apparatus which has been connected to the connection member 18 or the like, so that gripping of the wire-like body W can be released.

According to the above configuration, in such a case that the wire gripper 10 is attached to the wire-like body W, when the stationary gripping body 12 is placed on the wire-like body W and an operation force in one direction is applied to the swinging member 14 by a pulling means or the like, the swinging member 14 is swung in the one direction, and the movable gripping body 16 is moved toward the stationary gripping body 12, so that the wire-like body W can be gripped between the stationary gripping body 12 and the movable gripping body 16, and the state of gripping the wire-like body W is maintained by restricting swinging of the swinging member 14 in the other direction by advancing-movement operation of the pressing body 124 of the swinging member restricting portion 20.

In such a case that the wire gripper 10 is detached, when the operation force in the one direction applied to the swinging member 14 is released and swinging of the swinging member 14 in the other direction is released by performing a retreating-movement operation to the pressing member 124 of the swinging member restricting portion 20, the swinging member 14 is swung in the other direction and gripping of the wire-like body W performed by the movable gripping body 16 is released, so that the stationary gripping body 12 is detached from the wire-like body W and detachment of the wire gripper 10 can be performed.

Since the stationary gripping body 12 and the movable gripping body 16, the swinging member 14, and the swinging member restricting portion 20 for performing a work for attaching the wire gripper 10 to the wire-like body W and a work for detaching the wire gripper 10 from the wire-like body are arranged on the face side in the same direction, the work for attaching the wire gripper 10 to the wire-like body W and detaching the wire gripper 10 from the wire-like body W can be performed on the face side in the same direction. The work using the wire gripper 10 tends to be a high place work and a dangerous work but a work can be performed easily and safely according to an operation from on the face side in the same direction.

The present invention is not limited to the above embodiment but it may be modified variously based upon the spirit of the present invention.

A wire gripper which is another embodiment different from the wire gripper 10 shown in FIG. 1 will be described mainly with reference to FIG. 15 to FIG. 17.

FIG. 15 to FIG. 17 are illustration views of a wire gripper which is this another embodiment different from the wire gripper 10 shown in FIG. 1.

A wire gripper 10 of this embodiment is provided with a projection 168 which is engaged with the front end edge 68 of the swinging member 14 when pressed by the swinging member restricting portion 20.

The projection 168 has an arc-shaped projection shape in a front view and it projects toward a front direction opposed to the rear direction which is the side of pulling the connection member 18.

The swinging member restricting portion 20 is configured such that an inclination angle defined by a vertical line $L_1$ orthogonal to a direction of extension of the wire-like body W gripped by the stationary gripping body 12 and the movable gripping body 16 and passing through the supporting shaft 70 and a direction $L_2$ of pressing the front end edge 68 of the swinging member 14 by the swinging member restricting portion 20 is an angle of about 90°.

It is desirable for the swinging member restricting portion 20 in order to prevent the connection member 18 from interfering with the wire-like body W that the inclination angle does not exceed 90°.

However, when the inclination angle becomes less than 30°, the movement amount of the swinging member 14 cannot be restricted efficiently by pressing the swinging member 14.

Further, a wire gripper which is another embodiment from the wire gripper 10 shown in FIG. 1 will be described based upon FIG. 19 to FIG. 24.

The swinging member restricting portion 20 is provided with a guiding portion 122 formed in a supporting portion 120 provided in the stationary gripping body 12 and a pressing body 124 attached to the guiding portion 122 so as to be capable of advancing and retreating.

The supporting portion 120 is a plate-like body extending from the main body 22 toward the side opposed to the direction of pulling the connection member 18.

The guiding portion 122 is a plate-like body provided toward the near side in a projecting fashion at the vicinity of a distal end of the supporting portion 120 on the opposite side to the side of the main body 22, and it is provided so as to follow the supporting portion 120.

The guiding portion 122 is formed with a female screw hole 126 and the pressing body 124 is provided with an abutting portion 128 at a distal end thereof.

The guiding portion 122 is a rod-like body extending in a direction intersecting the direction of pulling the connection member 18 or in a direction orthogonal thereto, and it is configured such that the pressing body 124 can be stretched in the direction of pulling the connection member 18.

The pressing body 124 extends in a direction facing just below the wire-like body pressing-down portion 24 of the stationary gripping body 12 and in the direction of pulling the connecting member 18.

The pressing body 124 can be moved so as to advance and retreat according to screwing with the female screw hole 126 by rotationally operating the grip portion 130 fixed at the side of the rear end of the pressing body 124.

The pressing body 124 is formed with a male screw portion 132 screwed to the female screw hole 126 of the guiding portion 122 and an abutting portion 128 attached on a distal end side of the male screw portion 132 so as to be movable to advance and retreat.

As shown in FIGS. 19A and 21A, since the abutting portion 128 is biased to a distal end side thereof by a spring washer 134, the abutting portion 128 has advanced up to such a position that it abuts on the front end edge 68 of the swinging member 14.

The pressing body 124 advances and retreats in a direction parallel to a direction in which the swinging member 14 swings and corresponding to a direction in which the wire-like body pressing-down portion 24 of the stationary gripping body 12 extends.

The swinging member 14 swings in parallel to a direction in which the wire-like body pressing-down portion 24 of the stationary gripping body 12 extents.

When the pressing body 124 is moved to advance by rotationally operating the grip portion 130 in such a state that the wire-like body W has been gripped by the wire-like body pressing-down portion 24 of the stationary gripping body 12 and the movable gripping body 16, and is further moved to advance from such a state that the abutting portion 128 of the distal end portion has been caused to abut on an edge portion of the front end edge 68 of the swinging member 14, the abutting portion 128 is moved to retreat to put the spring washer 134 in a compressed state, as shown in FIG. 19A.

The ridge 40 is formed so as not to block action of the swinging member restricting portion 20.

The ridge 40 is configured such that the abutting portion 128 of the pressing body 124 of the swinging member restricting portion 20 does not come in contact with the an outer peripheral face thereof on a forward side.

The ridge 40 is configured to have a small shape and a small diameter on a lower side of the supporting shaft 70 so as not to come in contact with the abutting portion 128 such that, when the pressing body 124 of the swinging member restricting portion 20 has been advanced in a direction of the front end edge 68 of the swinging member 14, a swinging amount of the swinging member 14 swung to the side opposite to the side where the connection member 18 extends can be restricted by the swinging member restricting portion 20.

The swinging member 14 is formed so as not to block action of the swinging member restricting portion 20.

The swinging member 14 is configured to have a large frictional resistance such that when the abutting portion 128 of the pressing body 124 of the swinging member restricting portion 20 comes in contact with the front end edge 68, forward movement of the swinging member 14 can be restricted by the swinging member restricting portion 20.

The swinging member 14 is inclined or hung from the supporting shaft 70 at the upper side toward the connection member swinging shaft 72 at the lower side to have such a shape that the front end edge 68 comes in contact with the abutting portion 128 of the swinging member restricting portion 20 below the ridge 40 in such a manner that, when the pressing body 124 of the swinging member restricting portion 20 is advanced toward the front end edge 68 of the swinging member 14, a swinging amount of the swinging member 14 swung toward the side opposite to the side where the connection member 18 extends can be restricted by the swinging member restricting portion 20.

The front end edge 68 of the swinging member 14 extends approximately in parallel to a line ($L_3$) connecting the center of the supporting shaft 70 and the center of the connection member swinging shaft 72.

As shown in FIG. 19 to FIG. 24, the pressing body 124 is configured such that an inclination angle θ defined by a vertical line $L_1$ orthogonal to a direction in which the wire-like body W gripped by the stationary gripping body 12 and the movable gripping body 16 extends and passing through the supporting shaft 70 and a line $L_3$ crossing perpendicularly to a direction $L_2$ of pressing the front end edge 68 of the swinging member 14 by the swinging member restricting portion 20 (an advancing and retreating direction of the pressing body 124 of the swinging member restricting portion 20) falls in an angle in a range between 30° and 60°.

When the inclination angle θ to the line $L_3$ crossing perpendicularly in an advancing and retreating direction of the pressing body 124 of the swinging member restricting portion 20 falls in an angle in a range between 30° and 60°, the gripped state of the wire-like body W can be maintained securely.

In a wire gripper 10 shown in FIG. 19 and FIG. 20, the pressing body 124 is configured such that an inclination angle θ defined by the vertical line $L_1$ orthogonal to a direction in which the wire-like body W gripped by the stationary gripping body 12 and the movable gripping body 16 extends and passing through the supporting shaft 70 and the line $L_3$ crossing perpendicularly to the direction $L_2$ of pressing the front end edge 68 of the swinging member 14 by the swinging member restricting portion 20 (an advancing and retreating direction of the pressing body 124 of the swinging member restricting portion 20) becomes about 30°.

In a wire gripper 10 shown in FIG. 21 and FIG. 22, the pressing body 124 is configured such that an inclination angle θ defined by the vertical line $L_1$ orthogonal to a direction in which the wire-like body W gripped by the stationary gripping body 12 and the movable gripping body 16 extends and passing through the supporting shaft 70 and the line $L_3$ crossing perpendicularly to the direction $L_2$ of pressing the front end edge 68 of the swinging member 14 by the swinging member restricting portion 20 (an advancing and retreating direction of the pressing body 124 of the swinging member restricting portion 20) becomes about 45°.

In a wire gripper 10 shown in FIG. 23 and FIG. 24, the pressing body 124 is configured such that an inclination angle θ defined by the vertical line $L_1$ orthogonal to a direction in which the wire-like body W gripped by the stationary gripping body 12 and the movable gripping body 16 extends and passing through the supporting shaft 70 and the line $L_3$ crossing perpendicularly to the direction $L_2$ of pressing the front end edge 68 of the swinging member 14 by the swinging member restricting portion 20 (an advancing and retreating direction of the pressing body 124 of the swinging member restricting portion 20) becomes about 60°.

The wire gripper 10 shown in FIG. 23 and FIG. 24 is configured such that a length $D_1$ between an end of a pulling side of the coupling hole 84 of the connection member 18 and the pressing body 124 of the swinging member restricting portion 20 is shorter than that of the wire gripper 10 shown in FIG. 19 and FIG. 20, so that size reduction of the wire gripper 10 can be achieved as a whole.

When the clamping groove 24a of the wire-like body pressing-down portion 24 and the clamping groove 100 of the movable gripping body 16 are spaced from each other sufficiently, the front end edge 68 of the swinging member 14 comes close to the vertical line $L_1$ orthogonal to a direction in which the wire-like body W gripped by the stationary gripping body 12 and the movable gripping body 16 extends and passing through the supporting shaft 70.

A minimum space in which the abutting portion 128 and the spring washer 134 are received is formed between opposite faces of the front end edge 68 of the swinging member 14 and the guiding portion 122 of the swinging member restricting portion 20.

A length of the height of the abutting portion 128 plus the thickness of the spring washer 134 is configured so as to be approximately equal to or slightly shorter than the length between the opposite faces of the front end edge 68 of the swinging member 14 and the guiding portion 122 of the swinging member restricting portion 20.

When the clamping groove 24a of the wire-like body pressing-down portion 24 and the clamping groove 100 of the movable gripping body 16 have been brought close to each other, the front end edge 68 of the swinging member 14 separates from the vertical line $L_1$ orthogonal to a direction in which the wire-like body W gripped by the stationary gripping body 12 and the movable gripping body 16 extends and passing through the supporting shaft 70.

The abutting portion 128 of the swinging member restricting portion 20 is formed so as to be rotatable without causing seizure when it has come in contact with the front end edge 68 of the swinging member 14, and a contacting face thereof with the front end edge 68 of the swinging member 14 is formed in an egg shape or a semispherical shape.

INDUSTRIAL APPLICABILITY

The wire gripper according to the present invention can be applied to not only an electrical wire but also a wire-like body pulling a grapevine trellis or tree, or the like.

EXPLANATION OF REFERENCE SIGN 10 wire gripper
12 stationary gripping body
14 swinging member
16 movable gripping body
18 connection member
20 swinging member restricting portion
22 main body
24 wire-like body pressing-down portion
24a, 100 clamping groove
26 connection member guiding portion
28 guide hole
30 supporting shaft hole
32a, 40a top portion
32, 40 ridge
42 space
44 spring groove
48, 66 catching hole
50 first linear ridge
52 second linear ridge
60 stationary gripping body attaching hole
60a, 62a, 64a top portion of bulging portion around a far-side hole
60b, 62b, 64b top portion of bulging portion around a near-side hole
62 movable gripping body attaching hole
64 connection member attaching hole
68 front end edge
70 supporting shaft
70a, 72a, 74a axial center
70b, 72b, 74b flange portion
72 connection member swinging shaft
74 movable griping body swinging shaft
76 cotter pin
80 connection member main body
82 swinging member attaching hole
84 connection hole
92 one swinging member attaching portion
94 the other swinging member attaching portion
96 one swinging member attaching hole
98 the other swinging member attaching hole
98a step difference portion
110 biasing member
112 coil portion
114 first hooking portion
116 second hooking portion
120 supporting portion
122 guiding portion
124 pressing body
126 female screw hole 128 abutting portion
130 grip portion
132 male screw portion
134 spring washer
168 projection
W wire-like body

The invention claimed is:

1. A wire gripper comprising:
a stationary gripping body having a wire-like body pressing-down portion;
a swinging member swingably attached to the stationary gripping body by a supporting shaft;
a movable gripping body swung toward the wire-like body pressing-down portion of the stationary gripping body according to swinging of the swinging member and having a wire-like body holding portion;
a connection member connected to the swinging member by a connection member swinging shaft and swinging the swinging member, and
a swinging member restricting portion restricting an amount of swinging of the swinging member toward a side opposite to a side where the connection member extends, wherein
the stationary gripping body is provided with
a circular ridge as a reinforced portion formed around a supporting shaft hole in which the supporting shaft for attaching the swinging member is inserted in a region thereof where the supporting shaft for attaching the swinging member is attached, and
an arc-shaped ridge being separate from the circular ridge, formed at a position spaced from a hole edge of the supporting shaft hole in which the supporting shaft is inserted and the circular ridge along the hole edge, and the arc-shaped ridge is formed to surround the circular ridge and is spaced from an outer peripheral edge of the circular ridge; and
the circular ridge and the arc-shaped ridge are formed integrally with a main body of the stationary gripping body;
the swinging member is provided with a front end edge from a vicinity of a stationary gripping body attaching hole in which the supporting shaft for attaching to the stationary gripping body is inserted up to a vicinity of a connection member attaching hole in which the swinging shaft for attaching the connection member is inserted, the front end edge being located between the stationary gripping body attaching hole and the connection member attaching hole;
the connection member swinging shaft and a movable gripping body swinging shaft are positioned behind the supporting shaft in a rear direction which is the direction in which the connection member extends, the connection member swinging shaft is positioned below the supporting shaft, and the movable gripping body swinging shaft is positioned above the supporting shaft;
the connection member extends below the wire-like body pressing-down portion of the stationary gripping body, and the connection member extends above the connection member swinging shaft; and
a wire-like body clamped between the movable gripping body and the stationary gripping body is prevented from coming off between the movable gripping body whose movement amount is restricted by the swinging member restricting portion and the stationary gripping body.

2. The wire gripper according to claim 1, wherein an inclination angle defined by a vertical line orthogonal to a direction in which the wire-like body extends and a direction of pressing the front end edge of the swinging member by the swinging member restricting portion, the wire-like body being gripped by the stationary gripping body and the movable gripping body, the inclination angle being in a range between 30 degree and 90 degree.

3. The wire gripper according to claim 2, wherein the swinging member restricting portion is provided with a pressing body attached to the stationary gripping body so as to be capable of advancing and retreating to the front end edge of the swinging member, and
the inclination angle defined by a line in a direction of pressing performed by the pressing body, and a vertical line in a direction in which the wire-like body, gripped by the stationary gripping body and the movable gripping body and passing through the supporting shaft, extends is an angle in a range between 30 degrees and 90 degrees.

4. The wire gripper according to claim 3, wherein the stationary gripping body is provided with the circular ridge around the supporting shaft hole in which the supporting shaft for attaching the swinging member is inserted in order to protect the supporting shaft.

5. The wire gripper according to claim 4, wherein the circular ridge is provided on a first side of the stationary gripping body to which the connection member is attached, and
a linear ridge extends toward the wire-like pressing-down portion and the linear ridge is provided on a second side of the stationary gripping body opposite to the first side of the stationary gripping body to which the connection member is attached.

6. The wire gripper according to claim 2, wherein the stationary gripping body is provided with the circular ridge around the supporting shaft hole in which the supporting shaft for attaching the swinging member is inserted in order to protect the supporting shaft.

7. The wire gripper according to claim 6, wherein the circular ridge is provided on a first side of the stationary gripping body to which the connection member is attached, and
a linear ridge extends toward the wire-like pressing-down portion and the linear ridge is provided on a second side of the stationary gripping body opposite to the first side of the stationary gripping body to which the connection member is attached.

8. The wire gripper according to claim 1, wherein the swinging member restricting portion is provided with a pressing body attached to the stationary gripping body so as to be capable of advancing and retreating to the front end edge of the swinging member, and
an inclination angle defined by a line in a direction of pressing performed by the pressing body, and a vertical line in a direction in which the wire-like body gripped by the stationary gripping body and the movable gripping body and passing through the supporting shaft, extends is an angle in a range between 30 degree degrees and 90 degrees.

9. The wire gripper according to claim 8, wherein the stationary gripping body is provided with the circular ridge around the supporting shaft hole in which the supporting shaft for attaching the swinging member is inserted in order to protect the supporting shaft.

10. The wire gripper according to claim 9, wherein the circular ridge is provided on a first side of the stationary gripping body to which the connection member is attached, and a linear ridge extends toward the wire-like pressing-down portion and the linear ridge is provided on a second side of the stationary gripping body opposite to the first side of the stationary gripping body to which the connection member is attached.

11. The wire gripper according to claim 1, wherein the stationary gripping body is provided with a linear ridge extending toward the wire-like body pressing-down portion in a vicinity of the supporting shaft hole in which the supporting shaft for attaching the swinging member is inserted.

12. The wire gripper according to claim 11, wherein a plurality of ridges are provided at equal intervals from a hole edge of the supporting shaft hole on an opposite face of a face for attaching the swinging member.

13. The wire gripper according to claim 11, wherein the circular ridge is provided on a first side to which the connection member is attached, and the linear ridge is provided on a second side opposite to the first side to which the connection member is attached.

14. The wire gripper according to claim 1, wherein the circular ridge is provided on a first side of the stationary gripping body to which the connection member is attached, and
a linear ridge extends toward the wire-like pressing-down portion and the linear ridge is provided on a second side of the stationary gripping body opposite to the first side of the stationary gripping body to which the connection member is attached.

15. The wire gripper according to claim 1, wherein the circular ridge which is provided around the supporting shaft hole in which the supporting shaft for attaching the swinging member is inserted constitutes a seat on which the swinging member is placed;
the arc-shaped ridge being separate from the circular ridge constitutes a seat on which the swinging member is placed;
the circular ridge has a height approximately equal to height of the arc-shaped ridge; and
on planar surfaces formed on each top portion of the both ridges, the circular ridge and the arc-shaped ridge slidingly contact with the swinging member so as to rotate the swinging member about an axial center of the swinging shaft passing through the supporting shaft hole provided in the main body of the stationary gripping body.

* * * * *